United States Patent
Morita

(10) Patent No.: US 12,473,458 B2
(45) Date of Patent: Nov. 18, 2025

(54) SEALING METHOD

(71) Applicant: NITTO DENKO CORPORATION, Ibaraki (JP)

(72) Inventor: Kosuke Morita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 415 days.

(21) Appl. No.: 17/789,081

(22) PCT Filed: Dec. 24, 2020

(86) PCT No.: PCT/JP2020/048504
§ 371 (c)(1),
(2) Date: Jun. 24, 2022

(87) PCT Pub. No.: WO2021/132485
PCT Pub. Date: Jul. 1, 2021

(65) Prior Publication Data
US 2023/0037303 A1 Feb. 9, 2023

(30) Foreign Application Priority Data

Dec. 25, 2019 (JP) .................. 2019-235155

(51) Int. Cl.
- *C09J 7/10* (2018.01)
- *C09J 5/00* (2006.01)
- *C09J 7/38* (2018.01)

(52) U.S. Cl.
CPC . *C09J 7/10* (2018.01); *C09J 5/00* (2013.01); *C09J 7/38* (2018.01); *C09J 2301/416* (2020.08); *C09J 2481/00* (2013.01)

(58) Field of Classification Search
CPC . C09J 7/405; C09J 2481/00; C09J 7/10; C09J 7/38; C09J 5/00; C09J 2301/416; C09J 7/30; C09K 3/1012; C09K 2200/0682; B32B 7/06; B32B 27/286
See application file for complete search history.

(56) References Cited

U.S. PATENT DOCUMENTS

| | | | |
|---|---|---|---|
| 2016/0355704 A1* | 12/2016 | Takarada | G02B 5/3033 |
| 2019/0256751 A1* | 8/2019 | Townsend | C08K 5/17 |
| 2021/0122956 A1 | 4/2021 | Morita | |
| 2021/0122958 A1 | 4/2021 | Morita | |

FOREIGN PATENT DOCUMENTS

| | | |
|---|---|---|
| CA | 2 637 246 A1 | 8/2007 |
| CN | 112334562 A | 2/2021 |
| JP | 11-061050 A | 3/1999 |

(Continued)

OTHER PUBLICATIONS

Machine Translation of Hasegawa (WO2019189618A1), 2019 (Generated Jun. 10, 2024), Espacenet (Year: 2019).*

(Continued)

*Primary Examiner* — Andrew L Swanson
(74) *Attorney, Agent, or Firm* — Sughrue Mion, PLLC

(57) ABSTRACT

Provided is a sealing method that uses a photo-curable sealant sheet. The sealing method provided comprises, in the following order, a step of obtaining a photo-curable sealant sheet, a step of subjecting the sealant sheet to photoirradiation, and a step of applying the sealant sheet to a target object.

8 Claims, 3 Drawing Sheets

(56) References Cited

FOREIGN PATENT DOCUMENTS

| | | | |
|---|---|---|---|
| JP | 2006-526693 A | | 11/2006 |
| JP | 2008-530270 A | | 8/2008 |
| JP | 2012082266 A | * | 4/2012 |
| JP | 2019085408 A | * | 6/2019 |
| WO | 2005/000965 A1 | | 1/2005 |
| WO | 2006/086211 A1 | | 8/2006 |
| WO | WO-2019189618 A1 * | 10/2019 | ........... C08K 5/1515 |
| WO | 2020/004488 A1 | | 1/2020 |

OTHER PUBLICATIONS

Takamatsu Machine Translation, 2012 (generated Aug. 21, 2024), Espacenet (Year: 2012).*
Okumura, Machine Translation, JP2019085408A—Thiol Compound, Method for Synthesizing the Same and Use of the Thiol Compound, 2019 (generated Jul. 11, 2025), Espacenet (Year: 2019).*
Notice of Reasons for Refusal issued Nov. 24, 2023 in Japanese Application No. 2019-235155.
Notification of First Office Action dated Sep. 1, 2023 in Application No. 202080090230.5.
International Search Report for PCT/JP2020/048504 dated Mar. 23, 2021 [PCT/ISA/210].
Extended European Search Report dated Apr. 3, 2024 in Application No. 20908157.9.

* cited by examiner

SEALING METHOD

CROSS REFERENCE TO RELATED APPLICATIONS

This application is a National Stage of International Application No. PCT/JP2020/048504 filed Dec. 24, 2020, claiming priority based on Japanese Patent Application No. 2019-235155 filed Dec. 25, 2019, the entire content thereof is incorporated herein by reference.

TECHNICAL FIELD

The present invention relates to a sealing method, in particular, a sealing method using a photo-curable sealant sheet.

BACKGROUND ART

Sealant (or sealing agent) is widely used for various purposes. For instance, Patent Documents 1 and 2 teach curable liquid compositions used as sealant for aircrafts and aerospace. As materials for such aircraft sealant, liquid polysulfide polymers are known. Liquid polysulfide polymer includes —S—S— bonds in the molecule; and therefore, when allowed to cure, it can form a rubbery cured material having excellent resistance to oil such as jet fuel and hydraulic oil (oil resistance).

CITATION LIST

Patent Literature

[Patent Document 1] Japanese Patent Application Publication No. 2006-526693
[Patent Document 2] Japanese Patent Application Publication No. 2008-530270

SUMMARY OF INVENTION

Technical Problem

With a liquid sealant such as those described in the cited documents, however, because it is in a liquid form, it is difficult to achieve a precise application of a desired thickness in a desired area of the target object. Thus, even for a skilled worker, there is a limit to reducing the time required for application of liquid sealant. There are also concerns about increased manufacturing costs, decreased productivity and degraded sealing quality, arising from difficulties in training and securing workers.

Accordingly, instead of liquid sealant as above, the present inventors have conducted research and development of a sealant sheet that is in sheet form prior to curing treatment. As a result, a photo-curable sealant sheet has been created and practical forms thereof have been further embodied to complete this invention. In other words, an objective of this invention is to provide a sealing method using a photo-curable sealant sheet.

Solution to Problem

The sealing method provided by this Description comprises, in the following order, a step of obtaining a photo-curable sealant sheet, a step of subjecting the sealant sheet to photoirradiation, and a step of applying the sealant sheet to a target object. The photo-curable sealant sheet used in the sealing method is pre-formed in a sheet shape, thereby having good handling properties. According to the sealing method, before the photo-curable sealant sheet is applied to the target object, the sealant sheet is subjected to photoirradiation; and therefore, the sealant sheet can be photo-cured well without unevenness.

As the photo-curable sealant sheet used in the method disclosed herein, a prolonged-curing photo-curable sealant sheet (or a photo-curable sealant sheet having prolonged curing time) can be preferably used. The use of the prolonged-curing photo-curable sealant sheet leads to a higher degree of design freedom with the process between the sealant sheet's photoirradiation and its application to the target object. This may help increase the efficiency and precision of the sealing work.

As the photo-curable sealant sheet used in the method disclosed herein, an anionic photo-curable sealant sheet can be preferably selected. Here, the anionic photo-curable sealant sheet refers to a sealant sheet formulated so that an anion formed upon photoirradiation of the sealant sheet allows the curing reaction to proceed. In general, anionic reactions proceed more slowly than radical reactions. Thus, the use of the anionic photo-curable sealant sheet leads to a higher degree of design freedom with the process between the sealant sheet's photoirradiation and its application to the target object. This may help increase the efficiency and precision of the sealing work.

The step of applying the post-photoirradiation sealant sheet to the target object is preferably carried out before the sealant sheet's 25° C. storage modulus (storage modulus at 25° C.) rises above 0.7 MPa. After the sealant sheet is treated with photoirradiation, when the sealant sheet is applied to the target object before the photo-curing proceeds so far that the 25° C. storage modulus rises above 0.7 MPa, tight adhesion is likely obtained between the sealant sheet and the target object.

As the photo-curable sealant sheet used in the method disclosed herein, it is preferable to select a photo-curable sealant sheet having a 25° C. storage modulus of 0.7 MPa or less at one hour after the sealant sheet's exposed face is subjected to photoirradiation at 2000 $mJ/cm^2$ using a blacklight (this kind of 25° C. storage modulus may be referred to as a "post-photoirradiation one-hour storage modulus" hereinafter). This can secure a certain amount of time (or "usable time" hereinafter) for which the post-photoirradiation sealant sheet retains flexibility suited for application to the target object. This time can be used to carry out desired tasks and operations. This may help increase the efficiency and precision of the sealing work.

The method disclosed herein can be preferably practiced, using a photo-curable sealant sheet that forms a cured sealant having a tensile strength at break of 0.7 MPa or greater. The use of such a sealant sheet can enhance the seal reliability.

The photo-curable sealant sheet used in the method disclosed herein preferably has a pre-photoirradiation 25° C. storage modulus of 0.005 MPa or greater and 0.6 MPa or less. With the use of such a photo-curable sealant sheet, retention stability of the sheet shape can be well-balanced and combined with tightness of adhesion to the target object for application to the target object after pre-photoirradiation.

The photo-curable sealant sheet used in the method disclosed herein is preferably formed of a polysulfide-based sealant. Having a polysulfide structure, the sealant sheet may show excellent oil resistance.

The photo-curable sealant sheet used in the method disclosed herein preferably comprises a photobase generator.

The photobase generator-containing sealant is formulated so that photoirradiation can generate a base from the photobase generator to accelerate the curing reaction. Thus, it shows good storability when stored in an environment that inhibits base generation from the photobase generator. As the photobase generator, for instance, it is preferable to use a compound comprising a biguanidic cation (ionic biguanidic photobase generator). Such a photobase generator can favorably bring about a sealant sheet that combines well-balanced good pre-use storability and good curing properties (anionic photo-curing properties) when in use.

This Description provides a photo-curable sealant sheet used in a method disclosed herein. The photo-curable sealant sheet is preferably a prolonged-curing photo-curable sealant sheet (e.g., anionic photo-curable sealant sheet). The method disclosed herein can be preferably practiced using such a photo-curable sealant sheet.

The scope of the invention for which the present patent application seeks patent protection may include a suitable combination of the features described above and parts separated from the features.

DESCRIPTION OF EMBODIMENTS

Figure 1:
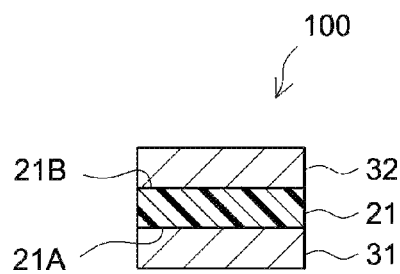
FIG. 1 shows a cross-sectional diagram schematically illustrating a constitutional example of the sealant sheet.

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent accurate sizes or reduction scales of the product actually provided.

<Constitutional Examples of Release-Linered Sealant Sheet>

A photo-curable sealant sheet is used as the sealant sheet in the method disclosed herein (including a sealing method, a method for forming a cured sealant, a method for producing a target object sealed with a cured sealant, etc.). In some embodiments, the photo-curable sealant sheet is used as a release-linered sealant sheet that comprises a release liner having a release face in contact with at least one face of the sealant sheet. Thus, in the sealing method disclosed herein, the step of obtaining a photo-curable sealant sheet can be a step of obtaining a release-linered sealant sheet comprising the photo-curable sealant sheet as a component. According to the sealing method using a release-linered sealant sheet, because the sealant sheet can be handled as a laminate with the release liner, the sealant sheet has good handling properties (e.g., size stability, suitability for transportation, processability, etc.). In addition, with the sealant sheet surface protected with the release liner, deformation by external forces and contamination such as dirt accumulation are prevented.

Figure 2:
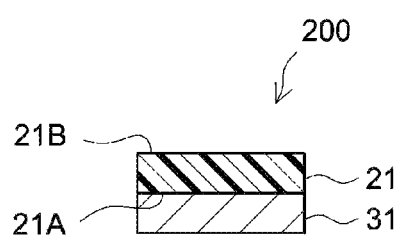
FIG. 2 shows a cross-sectional diagram schematically illustrating another constitutional example of the sealant sheet.

FIGS. 1 and 2 show constitutional examples of the release-linered sealant sheet that can be used in the method disclosed herein.

Release-linered sealant sheet 100 shown in FIG. 1 has a photo-curable sealant sheet 21, release liners 31 and 32 placed on two faces of sealant sheet 21. More specifically, in sealant sheet 21 shown in FIG. 1, one face (first face) 21A and the other face (second face) 21B thereof are protected, respectively, with release liners 31 and 32 each having a release face at least on the sealant sheet 21 side. Two release liners 31 and 32 are in contact with the respective faces of sealant sheet 21 and are removable from sealant sheet 21. Release liners 31 and 32 can be removed from sealant sheet 21 with light peel force when appropriate.

Each of release liners 31 and 32 can be translucent or non-translucent (light-blocking). In other words, between release liners 31 and 32, both can be translucent, both can be non-translucent, or one can be translucent while the other is non-translucent. Sealant sheet 21 having release liners 31 and 32 between which at least one is translucent can be cured by photoirradiation through the translucent release liner (through-liner photoirradiation). Such photoirradiation through a translucent release liner is preferable in view of preventing contamination such as dirt accumulation on the surface of sealant sheet 21, facilitating handling of sealant sheet 21, etc. Sealant sheet 21 can also be cured by photoirradiation to an exposed face with no protection by a release liner. From the standpoint of the efficiency of photoenergy use, etc., it may be advantageous to subject the exposed face of sealant sheet 21 to photoirradiation. For instance, a sealant sheet 21 whose release liners 31 and 32 are both non-translucent can be cured by removing one or both release liner(s) to expose the surface(s) of sealant sheet 21 and subjecting the exposed face(s) to photoirradiation. Photoirradiation of sealant sheet 21 can be performed on one side or both sides between the first and second faces 21A and 21B.

Release-linered sealant sheet 200 shown in FIG. 2 has a photo-curable sealant sheet 21 and a release liner 31 placed on the first face 21A thereof. More specifically, sealant sheet 21 has a constitution where one face 21A thereof is protected with release liner 31 having a release face on each side so that, when it is wound, the other face 21B of sealant sheet 21 is brought in contact with and protected also with release liner 31. Release liner 31 is in contact with face 21A of sealant sheet 21 and is removable from sealant sheet 21.

Release liner 31 can be removed from sealant sheet 21 with light peel force when appropriate. Release liner 31 can be translucent or non-translucent.

<Sealant Sheet>

The sealant sheet used in the method disclosed herein is pre-formed in a sheet shape and can be handled (e.g., subjected to photoirradiation, placed in an area to be sealed with it, etc.) in the sheet form. In this aspect, the sealant sheet is clearly distinct from a liquid sealant (e.g., a liquid sealant prepared by mixing liquid A containing a liquid polysulfide polymer and liquid B containing a curing agent for the polysulfide polymer immediately before application) applied in a liquid form to an area to be sealed. The sealant sheet used in the method disclosed herein is a photo-curable sealant sheet that undergoes curing by photoirradiation. In terms of having such curing properties, the sealant sheet used in the method disclosed herein is clearly distinct from the sealant after cured (cured sealant). Here, the term "photo-curable" means capable of being cured by photoirradiation. Accordingly, the photo-curable sealant sheet refers to a state before fully cured. The method disclosed herein is preferably practiced in an embodiment where the photo-curable sealant sheet is subjected to photoirradiation followed by application to a target object before the sealant sheet completely cures. The photo-curable sealant sheet after photoirradiation but before completion of curing can be thought as a semi-cured sealant sheet which can be further cured after placed in an area to be sealed.

As the sealant sheet used in the method disclosed herein, it is preferable to use a prolonged-curing photo-curable sealant sheet. Here, the term "prolonged-curing photo-curable sealant sheet" means that when the sealant sheet's exposed face is subjected to photoirradiation at 2000 mJ/cm$^2$ in an environment at 25° C. using a blacklight, the time (or "prolonged curing time") required for the sealant sheet's 25° C. storage modulus to double from the pre-photoirradiation 25° C. storage modulus (i.e., the initial storage modulus described later) is one hour or longer. The use of such a photo-curable sealant sheet helps secure a certain amount of usable time with the post-photoirradiation sealant sheet. For instance, this time can be used to carry out desired tasks and operations (e.g., transfer and processing of the sealant sheet, cleaning and pre-treatment of the application area, etc.) or to adjust the working time. The prolonged curing time can be 2 hours or longer, 3 hours or longer, 6 hours or longer, 12 hours or longer, or even 24 hours or longer. From the standpoint of shortening the time spent occupying space for curing until formation of cured sealant or shortening the waiting time when the subsequent steps need to wait for the formation of cured sealant, etc., the prolonged curing time is suitably 14 days or less, preferably 7 days or less, possibly 5 days or less, or even 72 hours or less.

The sealant sheet used in the method disclosed herein (i.e., a sealant sheet prior to photoirradiation) preferably has shape-holding properties that enable stable retention of the sheet shape at room temperature (e.g., about 25° C.). The shape-holding properties can also be thought as resistance to plastic deformation such as creep deformation. The sealant sheet used in the method disclosed herein can have a storage modulus at 25° C. (i.e., a storage modulus at 25° C. prior to photoirradiation or an "initial storage modulus" hereinafter) of, for instance, greater than 0.005 MPa, or preferably greater than 0.01 MPa. With increasing initial storage modulus of the sealant sheet, the handling properties and ease of processing (e.g., ease of cutting, anti-blocking properties, re-workability) of the sealant sheet tend to increase. In some embodiments, the initial storage modulus of the sealant sheet is suitably 0.02 MPa or greater, for instance, possibly 0.05 MPa or greater, 0.1 MPa or greater, or even 0.2 MPa or greater. The maximum initial storage modulus is not particularly limited and can be, for instance, 1 MPa or less. From the standpoint of broadening the selectable time frame between the sealant sheet's photoirradiation and its application to a target object, in some embodiments, the initial storage modulus of the sealant sheet is suitably 0.8 MPa or less, preferably 0.6 MPa or less, more preferably 0.5 MPa or less, possibly 0.4 MPa or less, 0.3 MPa or less, 0.2 MPa or less, or even 0.1 MPa or less.

The post-photoirradiation sealant sheet is preferably applied to a target object before the photo-curing proceeds too far. For instance, the method disclosed herein can be practiced in an embodiment where the post-photoirradiation sealant sheet is applied to a target object before its 25° C. storage modulus reaches above 1 MPa. Hereinafter, the 25° C. storage modulus of a sealant sheet at the time of application to a target object is also referred to as the "at-application storage modulus." From the standpoint of the tightness of adhesion to the target object, the sealant sheet has an at-application storage modulus of, for instance less than 1 MPa, advantageously 0.9 MPa or less, suitably 0.7 MPa or less, preferably 0.6 MPa or less, more preferably 0.5 MPa or less, possibly 0.4 MPa or less, 0.3 MPa or less, or even 0.2 MPa or less. From the standpoint of the handling properties and processability (e.g., ease of cutting, anti-blocking properties, reworkability, etc.) during the time between photoirradiation and subsequent application to the target object, in typical, the sealant sheet has an at-application storage modulus of suitably greater than 0.01 MPa, preferably 0.02 MPa or greater, possibly 0.05 MPa or greater, 0.1 MPa or greater, or even 0.2 MPa or greater.

The photo-curable sealant sheet used in the method disclosed herein has a post-photoirradiation one-hour storage modulus of suitably 1 MPa or less, or preferably 0.7 MPa or less. This helps secure a certain amount of usable time with the post-photoirradiation sealant sheet. For instance, this time can be used to carry out desired tasks and operations (e.g., transfer and processing of the sealant sheet, cleaning and pre-treatment of the application area, etc.) or to adjust the working time. In some embodiments, from the standpoint of enhancing the tightness of adhesion to the target object or extending the usable time, the post-photoirradiation one-hour storage modulus of the sealant sheet can be, for instance, 0.6 MPa or less, 0.5 MPa or less, 0.4 MPa or less, 0.3 MPa or less, or even 0.2 MPa or less. From the standpoint of the handling properties and processability (e.g., ease of cutting, anti-blocking properties, reworkability, etc.) during the time between photoirradiation and subsequent application to the target object, in typical, the post-photoirradiation one-hour storage modulus of the sealant sheet is suitably greater than 0.01 MPa, preferably 0.02 MPa or greater, possibly 0.05 MPa or greater, 0.1 MPa or greater, or even 0.2 MPa or greater.

As the photo-curable sealant sheet used in the method disclosed herein, it is preferable to use a sealant sheet that forms a cured sealant having a 25° C. storage modulus of 0.8 MPa or greater. The use of such a sealant sheet can enhance the seal reliability. In some embodiments, the cured sealant can have a 25° C. storage modulus of 1.0 MPa or greater, 1.2 MPa or greater, or even 1.5 MPa or greater. The maximum 25° C. storage modulus of the cured sealant is not particularly limited. The cured sealant's 25° C. storage modulus can be, for instance, 5.0 MPa or less, 3.0 MPa or less, or even 2.0 MPa or less.

In this Description, the respective storage moduli are determined at a frequency of 1 Hz at 0.5% strain, using a rheometer in a measurement environment at 25° C. As the rheometer, model name ARES G2 available from TA Instruments Japan, Inc. or a comparable system can be used. More specifically, the storage modulus is determined by the method described later in Examples.

With respect to the sealant sheet used in the method disclosed herein, when the sealant sheet's exposed face is subjected to photoirradiation at 2000 mJ/cm$^2$ in an environment at 25° C. using a blacklight, the time (or "allowable time" hereinafter) required for the sealant sheet's 25° C. storage modulus to reach 0.7 MPa is suitably 5 minutes or longer, preferably 10 minutes or longer, more preferably 15 minutes or longer, or yet more preferably 30 minutes or longer. A sealant sheet with longer allowable time tends to have a longer usable time in the method disclosed herein. This can broaden the selectable time frame between the sealant sheet's photoirradiation and its application to a target object, leading to a higher degree of process design freedom. From such a standpoint, in some embodiments, the allowable time can be 1 hour or longer, 3 hours or longer, 6 hours or longer, 12 hours or longer, or even 24 hours or longer. The maximum allowable time is not particularly limited. For instance, it can be 60 days or less, 30 days or less, or even 20 days or less. From the standpoint of shortening the time spent occupying space for curing until formation of cured sealant or shortening the waiting time when the subsequent steps need to wait for the formation of cured sealant, etc., in some embodiments, the allowable time is suitably 14 days or less, preferably 7 days or less, possibly 5 days or less, or even 72 hours or less.

The thickness of the sealant sheet is not particularly limited and can be selected in accordance with the thickness of the cured sealant to be obtained. From the standpoint of the sealing reliability, etc., in some embodiments, the sealant sheet may have a thickness of, for instance, 0.01 mm or greater, 0.03 mm or greater, 0.05 mm or greater, 0.1 mm or greater, or even 0.15 mm or greater. The method disclosed herein can also be practiced in an embodiment using a sealant sheet having a thickness of, for instance, greater than 0.3 mm, greater than 0.5 mm, greater than 1 mm, or even greater than 1.5 mm. In some embodiments, the sealant sheet may have a thickness of, for instance, 10 mm or less, 5 mm or less, 3 mm or less, 2 mm or less, 1 mm or less, 0.5 mm or less, or even 0.3 mm or less. With decreasing thickness of the sealant sheet, the photo-curing properties tend to improve. It may be advantageous to reduce the thickness of the sealant sheet from the standpoint of the conformability to surface contours in the area to be sealed, weight reduction, etc.

<Embodiments of Sealing Method>

With reference to Drawings, the following describes some examples including specific embodiments of the sealing method disclosed herein and modification examples for these. The sealing method disclosed herein is not to be limited to the embodiments illustrated in these specific examples.

1st Embodiment

The sealing method in this embodiment is carried out as described below.

First, a release-linered sealant sheet 100 having a structure shown in FIG. 1 is obtained (step S10, preparation step). In release-linered sealant sheet 100 used in this embodiment, release liners 31 and 32 are both non-translucent. By this, sealant sheet 21 can be blocked from light while in storage (prior to photoirradiation in the sealing method disclosed herein) and the storability (quality stability) of sealant sheet 21 can be enhanced. As sealant sheet 21, for instance, a species having an initial storage modulus in the range between 0.02 MPa and 0.1 MPa is used. Obtaining release-linered sealant sheet 100 includes cutting (e.g., die cutting with a Thomson blade, cutting with a tape cutter, etc.) release-linered sealant sheet 100 into a desirable shape to obtain a suitable size for easy handling or to conform to the shape and size of the area to be sealed.

Figure 3:
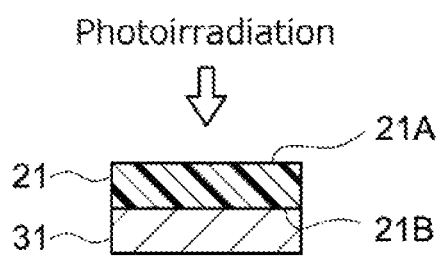
FIG. 3 shows a diagram illustrating the sealing method according to an embodiment.

Subsequently, release liner 31 is removed from sealant sheet 21 to expose the first face 21A. As shown in FIG. 3, photoirradiation treatment is carried out where the exposed first face 21A side of sealant sheet 21 is subjected to photoirradiation (step S14, photoirradiation step). To carry out the photoirradiation, for instance, release-linered sealant sheet 100 (from which release liner 31 has been removed) can be placed on the stage of an illumination device not shown in the drawing. The type of light source and the radiation dose can be selected to enable suitable photo-curing of sealant sheet 21 in accordance with the composition and structure of sealant sheet 21.

Figure 4:
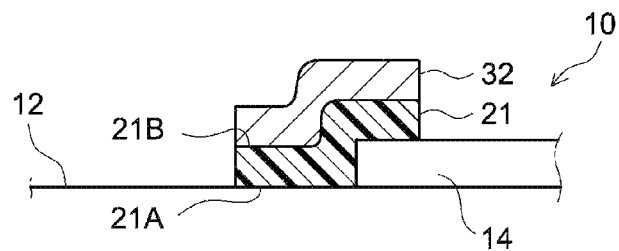
FIG. 4 shows a diagram illustrating the sealing method according to an embodiment.

As shown in FIG. 4, post-photoirradiation sealant sheet 21 is then applied to a target area in a target object 10 (step S16, application step). In the example shown in FIG. 4, target object 10 comprises a component 12 and a component 14 partially placed thereover; and sealant sheet 21 is applied to an area extending from an edge of component 14 to the top face of component 12 so as to cover the edge of component 14 while sealing the seam to component 12. The step of applying sealant sheet 21 to target object 10 is carried out before photo-curing of sealant sheet 21 completes, for instance, before the 25° C. storage modulus of sealant sheet 21 reaches above 0.2 MPa. In this embodiment, sealant sheet 21 is applied to target object 10 with release liner 32 layered on the second face 21B. By this, the first face 21A of sealant sheet 21 can be easily and precisely applied to target object 10.

In a modification example, sealant sheet 21 can be applied to target object 10 after removal of release liner 32 from the second face 21B. This can help sealant sheet 21 better conform to the surface structure of target object 10. After removal of release liner 32, sealant sheet 21 can be press-bonded to target object 10 using a jig, film, gloves or like with non-stick surface.

The time between the photoirradiation and application of sealant sheet 21 to target object 10 (the time after photoirradiation and before application) can be set in a range where suitable application is possible. For instance, immediately after irradiation, it can be 24 hours or less, 12 hours or less, etc. During this time, sealant sheet 21 with release liner 32 layered on the second face 21B can be subjected, as necessary, to transfer from the illumination device to where it is applied to the target object, shaping (e.g., die cutting with a Thomson blade), etc.; or it can be temporarily stored for time adjustment until target object 10 is ready (e.g., until completion of pre-processing, transfer, target area cleaning, pre-treatment or like with respect to the target object) or to deal with interruption of operations due to equipment inspection, changes of operators, etc. Alternatively, the method disclosed herein can be practiced in an embodiment where post-photoirradiation sealant sheet 21 is immediately applied to target object 10.

Figure 5:
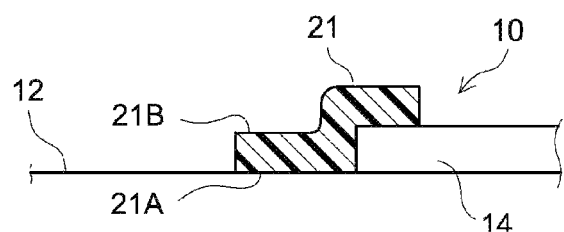
FIG. 5 shows a diagram illustrating a seal structure formed by the sealing method according to an embodiment.

After sealant sheet 21 is applied to target object 10, release liner 32 is removed from the second face 21B (see FIG. 5) and sealant sheet 21 is allowed to undergo curing to form a cured sealant (step S18, curing step). Target object 10 is thus sealed with the cured sealant. Release liner 32 can be removed immediately after application of sealant sheet 21 to target object 10, after formation of the cured sealant, or arbitrarily therebetween. It may be advantageous to remove release liner 32 early on after application of sealant sheet 21 in view of the sealant sheet 21's tightness of adhesion to target object 10 and shape precision. It may be advantageous to remove release liner 32 after further curing of sealant sheet 21 (possibly after formation of the cured sealant) in view of preventing dirt accumulation on the second face 21B.

In the sealing method disclosed herein, post-photoirradiation sealant sheet 21 applied to the target object 10 can be left at room temperature (e.g., 20° C. to 30° C., typically about 25° C.) to cure and form a cured sealant; and therefore, after application to target object 10, it is unnecessary to subject sealant sheet 21 to an additional separate curing treatment (e.g., photoirradiation, heating, etc.). However, as far as no particular issues arise, there are no restrictions on suitably giving a separate curing treatment to sealant sheet 21 on target object 10. The sealing method disclosed herein conceptually includes an embodiment where such a separate curing treatment is carried out.

2nd Embodiment

The sealing method in this embodiment is carried out as described below.

Similar to the first embodiment, a release-linered sealant sheet 100 having a structure shown in FIG. 1 is obtained (step S10, preparation step). In release-linered sealant sheet 100 used in this embodiment, however, release liner 31 is translucent. Release liner 32 can be translucent or non-translucent.

Figure 6:
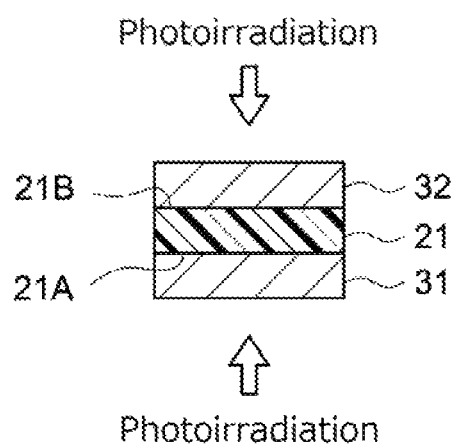
FIG. 6 shows a diagram illustrating the sealing method according to another embodiment.

Subsequently, photoirradiation treatment is carried out where sealant sheet 21 is subjected to photoirradiation through release liner 31 (step S14, photoirradiation step). The photoirradiation treatment can be carried out in the same manner as the photoirradiation in the first embodiment except that the photoirradiation to the first face 21A side of sealant sheet 21 is performed through release liner 31. When release liner 32 is translucent, for instance, as shown in FIG. 6, both sides of sealant sheet 21 can be subjected to photoirradiation through release liners 31 and 32. This can shorten the time required for photoirradiation treatment.

Release liner 31 is removed from post-photoirradiation sealant sheet 21 to expose the first face 21A. Subsequently, as shown in FIG. 4, sealant sheet 21 is applied to the target area in target object 10 (step S16, application step) and is allowed as is to undergo curing at room temperature to form a cured sealant (step S18, curing step). The application step and curing step can be carried out in the same manner as those in the first embodiment.

3rd Embodiment

The sealing method in this embodiment is carried out as described below.

Similar to the second embodiment, a release-linered sealant sheet 100 having a structure shown in FIG. 1 is obtained (step S10, preparation step). In release-linered sealant sheet 100 used in this embodiment, release liners 31 and 32 are both translucent.

As shown in FIG. 6, both sides of sealant sheet 21 are subjected to photoirradiation through release liners 31 and 32 (step S14, photoirradiation step).

Figure 7:
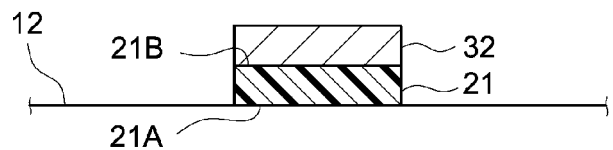
FIG. 7 shows a diagram illustrating the sealing method according to another embodiment.
Figure 8:
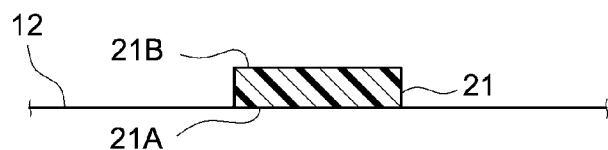
FIG. 8 shows a diagram illustrating the sealing method according to another embodiment.
Figure 9:
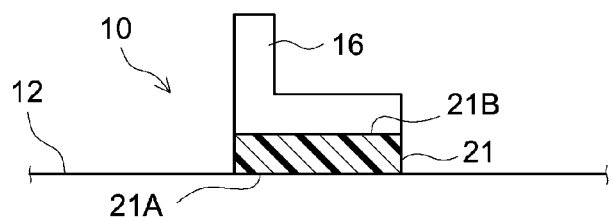
FIG. 9 shows a diagram illustrating a seal structure formed by the sealing method according to another embodiment.

Release liner 31 is removed from post-photoirradiation sealant sheet 21; the exposed first face 21A is applied to component 12 as shown in FIG. 7; release liner 32 is then removed from sealant sheet 21; and a component 16 is adhered to the exposed second face 21B (FIG. 8) as shown in FIG. 9 (step S16, application step). Like this, target object 10 in this embodiment comprises components 12 and 16 with sealant sheet 21 placed therebetween. The placement of sealant sheet 21 between components 12 and 16 (i.e., application of sealant sheet 21 to components 12 and 16) is carried out before completion of photo-curing, for instance, before the 25° C. storage modulus of sealant sheet 21 reaches above 0.2 MPa.

The resultant is then left at room temperature so that sealant sheet 21 undergoes curing to form a cured sealant (step S18, curing step). In this manner, the seam between components 12 and 16 constituting target object 10 is sealed with the cured sealant.

In a modification example, one side (e.g., the first face 21A side) of sealant sheet 21 can be subjected to photoirradiation through the release liner. Alternatively, using non-translucent release liners 31 and 32 in the same manner as the first embodiment, photoirradiation can be given to the first face 21A exposed upon removal of release liner 31.

4th Embodiment

The sealing method in this embodiment is carried out as described below.

Similar to the first embodiment, a release-linered sealant sheet 100 having a structure shown in FIG. 1 is obtained (step S10, preparation step). In release-linered sealant sheet 100 used in this embodiment, release liners 31 and 32 are both non-translucent.

Figure 10:
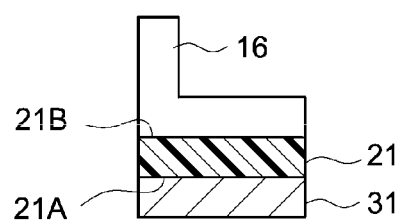
FIG. 10 shows a diagram illustrating the sealing method according to another embodiment.

Release liner 32 is removed from sealant sheet 21 to expose the second face 21B and the exposed second face 21B is applied to component 16 (FIG. 10).

Subsequently, release liner 31 is removed from sealant sheet 21 to expose the first face 21A and the exposed first face 21A side of sealant sheet 21 is subjected to photoirradiation (step S14, photoirradiation step).

As shown in FIG. 9, the first face 21A side of post-photoirradiation sealant sheet 21 is then applied to component 12 (step S16, application step). As described above, similar to the third embodiment, target object 10 in this embodiment comprises components 12 and 16 with sealant sheet 21 placed therebetween. The placement of sealant sheet 21 between components 12 and 16 (i.e., application of sealant sheet 21 to components 12 and 16) is carried out before completion of photo-curing, for instance, before the 25° C. storage modulus of sealant sheet 21 reaches above 0.2 MPa.

<Sealant Sheet Material>

Hereinafter, the sealant sheet that can be used in the method disclosed herein is described more in detail. The material of the sealant sheet disclosed herein is not particularly limited and various photo-curable materials can be used. Possible examples include silicone-based, modified silicone-based, silylated acrylic, acrylic, acrylic urethane-based, polyurethane-based, polysulfide-based, polyisobutylene-based, butyl rubber-based and like sealant materials. In particular, polysulfide-based sealant materials are preferable for their excellent oil resistance. The following description regards to polysulfide-based sealant materials as favorable examples, but is not to limit the material forming the sealant sheet disclosed herein to polysulfide-based sealant materials.

<Polysulfide Polymer (a)>

In some preferable embodiments, as the photo-curable sealant sheet, a photo-curable sealant sheet comprising a polysulfide polymer (A) is used. The polysulfide polymer (A) has a repeat unit that includes a disulfide structure represented by —S—S— and contributes to greater oil resistance of the cured material formed from the sealant sheet. The type (I) sealant sheet disclosed herein comprises the epoxy group-containing polysulfide polymer (AB) as the polysulfide polymer (A). The type (II) sealant sheet disclosed herein comprises the thiol group-containing polysulfide polymer (AC) as the polysulfide polymer (A).

One molecule of polysulfide polymer (A) may include one, two or more disulfides. From the standpoint of the oil resistance of the cured material, it is preferable to use a polysulfide polymer (A) having an average of three or more disulfide structures per molecule. The average number of disulfide structures per molecule of polysulfide polymer (A) (or the average disulfide group count, hereinafter) can be, for instance, 5 or greater, 10 or greater, 15 or greater, or even 20 or greater. The upper limit of the average disulfide group count is not particularly limited. From the standpoint of the ease of manufacturing the sealant sheet (e.g., the ease of molding into a sheet shape), etc., it can be, for instance, 100 or less, 70 or less, or even 50 or less.

The disulfide structure is preferably in the main chain of polysulfide polymer (A). When the main chain includes the disulfide structure, the resulting cured material tends to show good stretchiness.

In some embodiments, the polysulfide polymer (A) preferably includes a repeat unit represented by the next general formula (1):

—R$^1$—O—R$^2$—O—R$^3$—S—S— (1)

Here, R$^1$, R$^2$ and R$^3$ in the general formula (1) are independently an alkylene group with 1 to 4 carbon atoms, preferably an alkylene group with 1 to 3 carbon atoms, or more preferably an alkylene group with 1 or 2 carbon atoms. The repeat unit (1) has a structure in which an ether structure is connected to a disulfide structure. With a polysulfide polymer (A) having such a repeat unit (1), the resulting cured material tends to have excellent oil resistance and flexibility. The average number of repeat units (1) per molecule of polysulfide polymer (A) can be, for instance, 5 or greater, 10 or greater, 15 or greater, or 20 or greater. The average number can be, for instance, 100 or less, 70 or less, or even 50 or less. The polysulfide polymer (A) may have, per molecule, solely one region with successive repeat units (1), or two or more such regions.

In some embodiments, the polysulfide polymer (A) may include at least one among structures represented by the following general formulas (2a) and (2b):

—CH$_2$—S—CH$_2$CHOH—R' (2a)

—CH$_2$—S—CH(CH$_2$OH)—R' (2b)

Here, R' in the general formulas (2a) and (2b) is an organic group having at least one (e.g., about 1 to 5) epoxy group(s). The structures of the general formulas (2a) and (2b) can be formed, for instance, by addition reaction between a thiol having a structural moiety represented by —CH$_2$—SH and an epoxy compound having a substituent group R' on the epoxy ring. The number of structural units represented by the general formula (2a) or (2b) (the total number when both a structure represented by the general formula (2a) and a structure represented by the general formula (2b) are included) can be, as the average number per molecule of polysulfide polymer (A), for instance, 1.1 or greater, 1.3 or greater, 1.5 or greater, 1.8 or greater, 2.0 or greater, or even greater than 2.0. The average number can be, for instance, 15 or less, 10 or less, 7.0 or less, or even 5.0 or less.

Structures represented by the general formulas (2a) and (2b) can be formed by the addition reaction of thiol groups and epoxy groups. The polysulfide polymer (A) containing a structure represented by the general formula (2a) or (2b) can be, for instance, a reaction product of a thiol group-containing polysulfide having a disulfide structure and a thiol group in one molecule, and an epoxy compound having two or more epoxy groups in one molecule; or a modified product thereof.

The weight average molecular weight (Mw) of the thiol group-containing polysulfide as a precursor of the polysulfide polymer (A) is not particularly limited. For instance, it can be 500 or higher, 800 or higher, 1000 or higher, above 1000, or even above 2000. A thiol group-containing polysulfide having a higher Mw tends to lead to formation of a sealant sheet that provides a cured material with greater stretchiness. In some embodiments, the Mw of the thiol group-containing polysulfide can be, for instance, above 2500, above 3000, or even above 3500. The Mw of the thiol group-containing polysulfide can be, for instance, 30000 or lower, or even 10000 or lower. From the standpoint of the ease of handling and reactivity with the epoxy compound, in some embodiments, the Mw of the thiol group-containing polysulfide can be, for instance, below 9000, below 8000, below 7500, below 7000, or even below 6500.

Here, the Mw of the thiol group-containing polysulfide, an epoxy group-containing polysulfide described later, polysulfide polymer (A) or the like can be determined based on polyethylene glycol by gel permeation chromatography (GPC), using tetrahydrofuran (THF) as the mobile phase. Alternatively, a nominal value given in a catalog, literature and the like can be used.

The thiol group-containing polysulfide preferably includes the disulfide structure in the main chain. According to a sealant sheet comprising a polysulfide polymer (A) that is a reaction product (or a modified product thereof) of a thiol group-containing polysulfide with a disulfide structure in the main chain and an epoxy compound having two or more epoxy groups per molecule, the resulting cured material tends to show good stretchiness. The number (as the average number) of disulfide structures in one molecule of the thiol group-containing polysulfide (or the average disulfide group count of the entire thiol group-containing polysulfide used) can be, for instance, 3 or greater, 5 or greater, 10 or greater, 15 or greater, or even 20 or greater. The upper limit of the average disulfide group count is not particularly limited. From the standpoint of the ease of manufacturing the sealant sheet (e.g., the ease of molding into a sheet shape), etc., it can be, for instance, 100 or less, 70 or less, or even 50 or less.

The thiol group-containing polysulfide as a precursor of the polysulfide polymer (A) may include one, two or more thiol groups per molecule of thiol group-containing polysulfide. From the standpoint of readily obtaining a sealant sheet suited for increasing the strength of the cured material and reducing the curing time, a preferable thiol group-containing polysulfide includes more than one thiol group in average per molecule. The average number of thiol groups per molecule of the thiol group-containing polysulfide used (or the average thiol group count) can be, for instance, 1.1 or greater, 1.3 or greater, 1.5 or greater, 1.8 or greater, 2 or greater, or even greater than 2. The upper limit of the average thiol group count is not particularly limited. From the standpoint of the flexibility of the cured material, it can be, for instance, 15 or less, 10 or less, 7 or less, or even 5 or less. A polysulfide having an average of two or more thiol groups can be thought as a thiol compound (C) having two or more thiol groups per molecule.

The thiol group is preferably placed at a terminus of the thiol group-containing polysulfide. By allowing such a thiol group-containing polysulfide to react with an epoxy compound having two or more epoxy groups per molecule, a polysulfide polymer having a terminal epoxy group can be favorably formed. The thiol group-containing polysulfide used may have a thiol group at one terminus of the main chain or at each terminus of the main chain; it may further have another thiol group elsewhere besides the termini of the main chain; or it can be a mixture of these. It is particularly preferable to use a thiol group-containing polysulfide having a thiol group at each terminus of the main chain, that is, a thiol-bi-terminated polysulfide. According to a sealant sheet comprising a polysulfide polymer (A) synthesized using a thiol-bi-terminated polysulfide, the resulting cured material tends to combine well-balanced strength and stretchiness. In some embodiments, of the entire thiol group-containing polysulfide used, the ratio of the thiol-bi-terminated polysulfide can be, by weight, for instance, above 50%, above 70%, above 90%, above 95%, above 98%, or even essentially 100%.

The thiol-bi-terminated polysulfide is preferably represented by the next general formula (3):

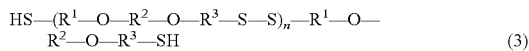

$$HS-(R^1-O-R^2-O-R^3-S-S)_n-R^1-O-R^2-O-R^3-SH \quad (3)$$

$R^1$, $R^2$ and $R^3$ in the general formula (3) are independently an alkylene group with 1 to 4 carbon atoms, preferably an alkylene group with 1 to 3 carbon atoms, or more preferably an alkylene group with 1 or 2 carbon atoms. In the general formula (3), n can be an integer selected so that the compound of the general formula (3) has a formula weight in a range of, for instance, 500 or higher and 10000 or lower, 800 or higher and below 9000, 1000 or higher and below 8000, above 1000 and below 8000, or above 2000 and below 7500.

In some embodiments, as the compound represented by the general formula (3), it is preferable to use a thiol group-containing polysulfide wherein $R^1$ is $C_2H_4$, $R^2$ is $CH_2$, and $R^3$ is $C_2H_4$. In this embodiment, n in the general formula (3) can be, for instance, 3 to 70, 5 to 60, 7 to 50, or even 10 to 50.

(Epoxy Group-Containing Polysulfide Polymer (AB))

Among the sealant sheets disclosed herein, the type (I) sealant sheet may comprise, as the polysulfide polymer (A), an epoxy group-containing polysulfide polymer (AB) having two or more epoxy groups per molecule and may further comprise a thiol compound (C) having two or more thiol groups per molecule. In some preferable embodiments, the sealant sheet may further comprise a photobase generator (D). The sealant sheet in such an embodiment may further include or may be free of a polysulfide polymer (A) that is not an epoxy group-containing polysulfide polymer (AB). The sealant sheet in this embodiment may further include or may be free of an epoxy compound (B) that is not an epoxy group-containing polysulfide polymer (AB).

The average number of epoxy groups per molecule of epoxy group-containing polysulfide polymer (AB) (or the average epoxy group count, hereinafter) can be, for instance, about 2 or greater and 20 or less. From the standpoint of the flexibility of the cured material, the average epoxy group count can also be, for instance, 15 or less, 10 or less, 7 or less, or even 5 or less. In some embodiments, the average epoxy group count can be 4 or less, or even 3 or less. The average epoxy group count is typically 2 or greater. From the standpoint of the curing properties and the cured material's strength, it can also be above 2, or even 2.5 or greater. In some embodiments, the average epoxy group count can be, for instance, 3 or greater, or even 4 or greater.

The epoxy groups in the epoxy group-containing polysulfide polymer (AB) are preferably located at a terminus of the epoxy group-containing polysulfide polymer (AB). With such an epoxy group-containing polysulfide polymer (AB), the resulting cured material tends to be highly stretchable. The sealant sheet disclosed herein may include an epoxy group-containing polysulfide polymer (AB) that has two or more epoxy groups at one terminus of the main chain; it may include an epoxy group-containing polysulfide polymer (AB) that has one, two or more epoxy groups at each terminus of the main chain; or it may include both of these. The epoxy group-containing polysulfide polymer (AB) having an epoxy group at one terminus of the main chain may have a non-epoxy functional group at a terminus different from the terminus having the epoxy group. The non-epoxy functional group can be, for instance, a thiol group, amino group, hydroxy group, etc. The sealant sheet disclosed herein preferably includes at least an epoxy group-containing polysulfide polymer (AB) having an epoxy group at each terminus of the main chain. With the inclusion of an epoxy group-containing polysulfide polymer (AB) having such a structure, the resulting cured material tends to combine well-balanced strength and stretchiness. For instance, it is preferable to use an epoxy group-containing polysulfide polymer (AB) having one epoxy group at each terminus of the main chain.

The epoxy group-containing polysulfide polymer (AB) can be obtained by allowing a thiol group-containing polysulfide as those described above to react with an epoxy compound having two or more epoxy groups per molecule, with epoxy groups in excess. The epoxy compound can be a bifunctional epoxy compound having two epoxy groups per molecule or a polyfunctional epoxy compound having three or more epoxy groups per molecule. As the epoxy compound, solely one species or a combination of two or more species can be used. From the standpoint of the ease of handling at the reaction with the thiol group-containing polysulfide, etc., in some embodiments, it is preferable to use an epoxy compound that exists as liquid at room temperature.

Examples of the bifunctional epoxy compound include, but are not limited to, bisphenol A epoxy resins, bisphenol F epoxy resins, hydrogenated bisphenol A epoxy resins (i.e. epoxy compounds corresponding to that in structure resulting from hydrogenation of bisphenol A epoxy resins to convert aromatic rings to cycloalkyl rings), hydrogenated F epoxy resins, biphenyl epoxy resins, aliphatic epoxy resins (e.g., polypropylene glycol-based epoxy resins, etc.), 1,6-hexanediol diglycidyl ether, and polyethylene glycol diglycidyl ether.

Examples of the polyfunctional epoxy compound include, but are not limited to, novolac-based epoxy resins, glycidyl amine-based epoxy resins, biphenyl-based epoxy resins, triphenylmethane-based epoxy resins, dicyclopentadiene-based epoxy resins, glycerin-based epoxy resins, trimethylol propane-based epoxy resins, N,N,N',N'-tetraglycidyl-m-xylenediamine, 1,3-bis(N,N-diglycidylaminomethyl)cyclohexane, and polyglycerol polyglycidyl ether. The number of epoxy groups in one molecule of the polyfunctional epoxy compound is at least 3 or greater, can be 4 or greater, or even 5 or greater. The number of epoxy groups in one molecule of the polyfunctional epoxy compound is usually suitably 10 or less, possibly 8 or less, or even 6 or less.

In some embodiments, as the epoxy compound, a bifunctional epoxy compound can be preferably used. The use of the bifunctional epoxy compound can be advantageous in obtaining a sealant sheet that gives a cured material showing suitable stretchiness. As the bifunctional epoxy compound, solely one species or a combination of two or more species can be used.

In some embodiments, as the bifunctional epoxy compound, it is preferable to use an epoxy compound having a five-membered or larger carbon ring structure in the molecule. With a sealant sheet formed using a bifunctional epoxy compound having such a structure, the resulting cured material tends to show high strength and good stretchiness. The five-membered or larger carbon ring structure can be, for instance, a benzene ring, naphthalene ring, cyclohexyl ring, etc. Examples of the epoxy compound including such a carbon ring structure include bisphenol A epoxy resins, bisphenol F epoxy resins, hydrogenated bisphenol A epoxy resins, hydrogenated bisphenol F epoxy resins, and biphenyl epoxy resins. In some preferable embodiments, as the bifunctional epoxy compound, a bisphenol F epoxy resin can be used.

As the epoxy compound, one, two or more species of polyfunctional epoxy compound can be used in combination with a bifunctional epoxy compound or in place of the bifunctional epoxy resin. The use of a polyfunctional epoxy resin may increase the strength of the cured material. The combined use of a bifunctional epoxy compound and a polyfunctional epoxy compound can bring about a sealant sheet that provides a cured material that combines strength and stretchiness at a high level.

In some embodiments, as the polyfunctional epoxy compound, it is possible to use a polyfunctional epoxy compound having an epoxy group-containing repeat unit (i.e. a polyfunctional epoxy polymer) and it is preferable to use, for instance, a novolac-based epoxy resin. Examples of the novolac-based epoxy resin include phenol novolac-based epoxy resins and o-cresol novolac-based epoxy resins. The use of a novolac-based epoxy resin may be advantageous in obtaining a sealant sheet that gives a cured material with high strength and good stretchiness. With the use of a novolac-based epoxy resin having a lower molecular weight, the stretchiness of the cured material tends to increase. For instance, it is preferable to use a phenol novolac-based epoxy resin that exists as liquid at room temperature.

When carrying out the reaction between the thiol group-containing polysulfide and the epoxy compound having two or more epoxy groups in one molecule, any of a suitable catalyst can be used as long as the effect obtainable by the art disclosed herein is not greatly impaired. For instance, a known base catalyst can be suitably selected and used, such as 2,4,6-triaminomethylphenol, triethylamine, and 1,8-diazabicyclo[5.4.0]undeca-7-ene.

When using a basic catalyst, its amount used is not particularly limited and can be selected to suitably obtain the catalytic activity. In some embodiments, relative to 100 parts by weight of the total amount of the thiol group-containing polysulfide and the epoxy compound having two or more epoxy groups per molecule, the amount of basic catalyst used can be, for instance, 1 part by weight or less; it is usually typically 0.5 part by weight or less, possibly 0.2 part by weight or less, 0.1 part by weight or less, or even 0.08 part by weight or less. From the standpoint of enhancing the storage properties of the sealant sheet, it is advantageous to not use the basic catalyst in large excess. From such a standpoint, the amount of basic catalyst used to 100 parts by weight of the total amount can be, for instance, 0.07 part by weight or less, 0.05 part by weight or less, 0.03 part by weight or less, or even 0.02 part by weight or less. The minimum amount of basic catalyst used to 100 parts by weight of the total amount is not particularly limited and it can be, for instance, 0.001 part by weight or greater, or even 0.005 part by weight or greater.

The reaction can proceed by mixing a thiol group-containing polysulfide and an epoxy compound having two or more epoxy groups in one molecule as well as a catalyst used as necessary in a suitable reaction vessel. In some preferable embodiments, a thiol group-containing polysulfide, a bifunctional epoxy compound, a polyfunctional epoxy compound and a catalyst (e.g., a basic catalyst) are mixed in a suitable reaction vessel. There are no particular limitations to the method for supplying the respective materials to the reaction vessel or the order of mixing them, and they can be selected to form a suitable reaction product. The reaction conditions can be suitably selected as long as the effect obtainable by the art disclosed herein is not greatly impaired. In some embodiments, the reaction can be carried out at a reaction temperature of, for instance, 0° C. to 120° C., preferably 5° C. to 120° C., or more preferably 10° C. to 120° C. In view of the ease of controlling the reaction and the reaction efficiency, in some embodiments, the reaction temperature can be, for instance, 20° C. to 100° C., 30° C. to 100° C., 40° C. to 100° C., or even 60° C. to 100° C. The reaction time is not particularly limited and can be selected, for instance, in a range of 10 minutes to 720 hours (preferably 1 hour to 240 hours).

In some embodiments, the reaction is allowed to proceed by carrying out, in the following order, a first heating step performed at a temperature of, for instance, 60° C. to 120° C. (preferably 70° C. to 110° C.); and a second heating step performed at a temperature of 40° C. to 80° C. (preferably 50° C. to 70° C.). By carrying out the heating process in such a stepwise manner, it is possible to inhibit the polysulfide product from obtaining an excessively high elastic modulus and efficiently carry out the step of mixing (e.g., kneading) the reaction product and additives such as filler. The second heating step is preferably performed at a temperature lower than that of the first heating step. The heating time in the first heating step is, for instance, possibly 10 minutes or longer, usually suitably 30 minutes or longer, or also possibly 1 hour or longer. In some preferable embodiments, the heating time in the first heating step can be selected, for instance, from the range of 10 minutes to 24 hours (preferably 30 minutes to 12 hours, more preferably 1 hour to 6 hours). The heating time in the second heating step is, for instance, possibly 3 hours or longer, usually suitably 6 hours or longer, or also possibly 24 hours or longer. In some preferable embodiments, the heating time in the second heating step can be selected, for instance, from the range of 3 hours to 720 hours (preferably 48 hours to 500 hours, more preferably 72 hours to 300 hours). The heating time of the second heating step is preferably longer than that of the first heating step. It is noted that the heating process can be carried out stepwise, divided into three or more steps.

In the synthesis of epoxy group-containing polysulfide polymer (AB) by the reaction described above, the ratio between the thiol group-containing polysulfide and the epoxy compound used can be selected so that the ratio of the total number of epoxy groups in the epoxy compound to the total number of thiol groups in the thiol group-containing polysulfide, i.e., the equivalent ratio of epoxy groups/thiol groups (or the epoxy/thiol ratio, hereinafter), has a value above 1. In some embodiments, the epoxy/thiol ratio value can be, for instance, 1.05 or greater, or even 1.1 or greater. From the standpoint of increasing the strength of the cured material, etc., in some embodiments, the epoxy/thiol ratio value can be, for instance, above 1.2, above 1.4, above 1.5, or even above 1.7. The epoxy/thiol ratio value can be, for instance, below 7.0, below 5.0, below 4.5, or even below 4.0. In some embodiments, from the standpoint of enhancing the stretchiness of the cured material, etc., the epoxy/thiol ratio value can be, for instance, below 3.5, below 3.2, below 3.0, below 2.5, below 2.0, or even below 1.8.

In the synthesis of the epoxy group-containing polysulfide polymer (AB) by the reaction described above, there are no particular limitations to the amount of the epoxy compound having two or more epoxy groups per molecule used. For instance, the epoxy compound can be used in an amount to obtain an aforementioned epoxy/thiol ratio value. In some embodiments, the amount of the epoxy compound used to 100 parts by weight of the thiol group-containing polysulfide is, for instance, possibly 1 part by weight or greater, usually suitably 3 parts by weight or greater, also possibly 5 parts by weight or greater, or even 7 parts by weight or greater. The amount of the epoxy compound used to 100 parts by weight of the thiol group-containing polysulfide is, for instance, possibly 50 parts by weight or less, usually suitably 30 parts by weight or less, also possibly 20 parts by weight or less, or even 15 parts by weight or less.

(Thiol Group-Containing Polysulfide Polymer (AC))

Among the sealant sheets disclosed herein, the type (II) sealant sheet may comprise, as the polysulfide polymer (A), a thiol group-containing polysulfide polymer (AC) having two or more thiol groups per molecule and may further comprise an epoxy compound (B) having two or more epoxy groups per molecule. In some preferable embodiments, the sealant sheet may further comprise a photobase generator (D). The sealant sheet in such an embodiment may further include or may be free of a polysulfide polymer (A) that is not a thiol group-containing polysulfide polymer (AC). The sealant sheet in this embodiment may further include or may be free of a thiol compound (C) that is not a thiol group-containing polysulfide polymer (AC).

The average thiol group count in the thiol group-containing polysulfide polymer (AC) is typically 2 or greater, or even greater than 2. The upper limit of the average thiol group count is not particularly limited. From the standpoint of the flexibility of the cured material, it is usually suitably 10 or less, possibly 7 or less, 5 or less, 4 or less, 3 or less, 2.8 or less, or even 2.4 or less.

The thiol groups in the thiol group-containing polysulfide polymer (AC) are preferably placed at a terminus of the thiol group-containing polysulfide polymer (AC). With such a thiol group-containing polysulfide polymer (AC), the resulting cured material tends to be highly stretchable. A preferable thiol group-containing polysulfide polymer (AC) has one, two or more thiol groups at each terminus of the main chain. A more preferable thiol group-containing polysulfide polymer (AC) has one thiol group at each terminus of the main chain. With the inclusion of a thiol group-containing polysulfide polymer (AC) having such a structure, the resulting cured material tends to combine well-balanced strength and stretchiness.

As the thiol group-containing polysulfide polymer (AC), it is possible to use, for instance, a species obtainable by allowing an aforementioned epoxy group-containing polysulfide polymer (AB) to react with a thiol compound having two or more thiol groups per molecule, with thiol groups in excess. The thiol compound can be a bifunctional thiol compound having two thiol groups per molecule or a polyfunctional thiol compound having three or more thiol groups per molecule. As the thiol compound, solely one species or a combination of two or more species can be used. From the standpoint of obtaining a sealant sheet that provides a favorably stretchable cured material, a bifunctional thiol compound can be preferably used. For instance, of the thiol compound allowed to react with the epoxy groups in the epoxy group-containing polysulfide polymer (AB), the bifunctional thiol compound can account for 50% by weight or more, 70% by weight or more, or 90% by weight or more. A bifunctional thiol compound can be used solely as the thiol compound.

As the thiol compound allowed to react with the epoxy group-containing polysulfide polymer (AB), for instance, it is possible to use one, two or more species selected among the usable materials for the thiol compound (C) described later. The reaction between the epoxy group-containing polysulfide polymer (AB) and the thiol compound can be allowed to proceed in the same manner as for the reaction between a thiol group-containing polysulfide and an epoxy compound described earlier.

In the synthesis of thiol group-containing polysulfide polymer (AC) by the reaction described above, the ratio between the epoxy group-containing polysulfide and the thiol compound used can be selected so that the ratio of the total number of thiol groups in the thiol compound to the total number of epoxy groups in the epoxy group-containing polysulfide, i.e., the epoxy/thiol ratio, has a value below 1. From the standpoint of increasing the strength of the cured material, etc., in some embodiments, the epoxy/thiol ratio value can be, for instance, 0.95 or less, 0.9 or less, or even 0.85 or less. The epoxy/thiol ratio value is, for instance, possibly 0.1 or greater, or usually suitably 0.2 or greater. In some embodiments, from the standpoint of enhancing the stretchiness of the cured material, etc., the epoxy/thiol ratio value can be, for instance, 0.3 or greater, 0.5 or greater, 0.6 or greater, or even 0.7 or greater.

In the synthesis of the thiol group-containing polysulfide polymer (AC) by the reaction described above, there are no particular limitations to the amount of the thiol compound having two or more thiol groups per molecule used. For instance, the thiol compound can be used in an amount to obtain an aforementioned epoxy/thiol ratio value. In some embodiments, the amount of the thiol compound used to 100 parts by weight of the epoxy group-containing polysulfide is, for instance, possibly 1 part by weight or greater, usually suitably 3 parts by weight or greater, also possibly 5 parts by weight or greater, or even 7 parts by weight or greater. The amount of the thiol compound used to 100 parts by weight of the epoxy group-containing polysulfide is, for instance, possibly 50 parts by weight or less, usually suitably 30 parts by weight or less, also possibly 20 parts by weight or less, or even 15 parts by weight or less.

As the thiol group-containing polysulfide polymer (AC) in the type (II) sealant sheet, for instance, it is also possible to use a thiol group-containing polysulfide (preferably a thiol-bi-terminated polysulfide) described earlier as the material that can be used as a precursor of polysulfide polymer (A).

<Epoxy Compound (B)>

In some embodiments, the sealant sheet comprises an epoxy compound (B). As the epoxy compound (B) in the sealant sheet disclosed herein, a compound having two or more epoxy groups per molecule can be used without particular limitations. For instance, one, two or more species can be used, selected from the group consisting of the various bifunctional epoxy compounds and polyfunctional epoxy compounds exemplified as the materials that can be used for preparing the epoxy group-containing polysulfide polymer (AB).

In view of the balance between the sealant sheet's storability prior to use and curing properties upon use, it is preferable to use an epoxy compound (B) having an epoxy equivalence in the range of 50 g/eq or higher and 600 g/eq or lower. The epoxy equivalence can be, for instance, 100 g/eq or higher, 120 g/eq or higher, 150 g/eq or higher; and it can be, for instance, 400 g/eq or lower, 300 g/eq or lower, or even 200 g/eq or lower. With increasing epoxy equivalence, the storability prior to use improves while the curing properties upon use tend to degrade. When using two or more species of epoxy compounds (B), the sum of the products of the epoxy equivalences and the weight fractions of the respective epoxy compounds (B) is preferably in these ranges. It is noted that the epoxy equivalence refers to the gram count per equivalence (equivalent weight) of the epoxy group-containing compounds and can be determined based on JIS K7236:2001. Alternatively, nominal values given in a catalog, literature, etc., can be used as well.

The average epoxy group count of the epoxy compound (B) can be, for instance, about 2 or greater and 10 or less. From the standpoint of the flexibility of the cured material, the average epoxy group count can be, for instance, 7 or less, 5 or less, 4 or less, or even below 4. In some embodiments, the average epoxy group count can be 3 or less, 2.5 or less, or even 2.2 or less. As the epoxy compound (B), one, two or more species of bifunctional epoxy compounds can be used solely. According to such an embodiment, the resulting sealant sheet is likely to provide a favorably stretchable cured material.

<Thiol Compound (C)>

In some embodiments, the sealant sheet comprises a thiol compound (C). As the thiol compound (C) in the sealant sheet disclosed herein, a compound having two or more thiol groups per molecule can be used without particular limitations. Examples include, but are not limited to, trimethylolpropane tris(thiopropionate) (or trimethylolpropane tris(3-mercaptopropionate)), pentaerythritol tetrakis (thiopropionate), ethylene glycol bisthioglycolate, 1,4-butanediol bisthioglycolate, trimethylolpropane tris (thioglycolate), pentaerythritol tetrakis(thioglycolate), di(2-mercaptoethyl) ether, 1,4-butanedithiol, 1,5-dimercapto-3-thiapentane, 1,8-dimercapto-3,6-dioxaoctane, 1,3,5-trimercaptomethylbenzene, 4,4'-thiodibenzenethiol, 1,3,5-trimercaptomethyl-2,4,6-trimethylbenzene, 2,4,6-trimercapto-s-triazine, 2-dibutylamino-4,6-dimercapto-s-triazine, pentaerythritol tetrakis(3-mercaptopropionate) and dipentaerythritol hexakis(3-mercaptopropionate).

Examples of commercial thiol compounds (C) include, but are not limited to, JER MATE QX11, QX12, JER CURE QX30, QX40, QX60, QX900, and CAPCURE CP3-800 available from Mitsubishi Chemical Corporation; OTG, EGTG, TMTG, PETG, 3-MPA, TMTP and PETP available from Yodo Kagaku Co., Ltd.; TEMPIC, TMMP, PEMP, PEMP-II-20P and DPMP available from Sakai Chemical Industry Co., Ltd.; and Karenz MT PE1, Karenz MT BD1, Karenz MT NR1, TPMB and TEMB available from Showa Denko K. K. Among these compounds, each can be used alone or a mixture of two or more species can be used as well.

The average thiol group count of the thiol compound (C) can be, for instance, about 2 or greater and 10 or less. From the standpoint of the flexibility of the cured material, the average thiol group count can be, for instance, 7 or less, 5 or less, 4 or less, or even below 4. In some embodiments, the average thiol group count can be 3 or less, 2.5 or less, or even 2.2 or less. As the thiol compound (C), one, two or more species of bifunctional thiol compounds can be used solely. According to such an embodiment, the resulting sealant sheet is likely to provide a favorably stretchable cured material.

As the thiol compound (C), it is possible to use a compound having a primary thiol group (or a primary thiol compound), a compound having a secondary thiol group (a secondary thiol compound), or a compound having a tertiary thiol group (a tertiary thiol compound). From the standpoint of the curing properties when the sealant sheet is used, a primary thiol compound can be preferably used. From the standpoint of the curing rate control and storability of the sealant sheet prior to use, a secondary or higher thiol compound (i.e. a secondary thiol compound and/or a tertiary thiol compound) can be preferably used. It is noted that hereinafter, a thiol compound having two primary thiol groups per molecule may be referred to as a primary bifunctional thiol compound and a thiol compound having two secondary thiol groups per molecule may be referred to as a secondary bifunctional thiol compound.

In some embodiments, as the thiol compound (C), a primary thiol compound and a secondary or higher thiol compound (e.g., a secondary thiol compound) can be used together. According to such an embodiment, it is possible to favorably combine storability of the sealant sheet prior to use and curing properties upon its use. The weight ratio of the primary thiol compound in the total weight of the primary and secondary or higher thiol compounds is not particularly limited. It is, for instance, possibly 5% by weight or higher, preferably 15% by weight or higher, more preferably 25% by weight or higher, or also possibly 35% by weight or higher; and it is, for instance, possibly 95% by weight or lower, preferably 75% by weight or lower, also possibly 60% by weight or lower, or even 45% by weight or lower.

As the thiol compound (C), in view of the balance between the sealant sheet's storability prior to use and curing properties upon use, it is preferable to use a species having a thiol equivalence in the range of 45 g/eq or higher and 450 g/eq or lower. The thiol equivalence can be, for instance, 60 g/eq or higher, 70 g/eq or higher, 80 g/eq or higher; and it can be, for instance, 350 g/eq or lower, 250 g/eq or lower, 200 g/eq or lower, or even 150 g/eq or lower. With increasing thiol equivalence, the storability prior to use improves while the curing properties upon use tend to degrade. When using two or more species of thiol compounds (C), the sum of the products of the thiol equivalences and the weight fractions of the respective thiol compounds (C) is preferably in these ranges. It is noted that the thiol equivalence refers to the gram count per equivalence (equivalent weight) of the thiol group-containing compounds and can be determined by iodometry. Alternatively, nominal values given in a catalog, literature, etc., can be used as well.

In either the type (I) or type (II) sealant sheet disclosed herein, there are no particular limitations to the ratio of the epoxy group equivalence to the thiol group equivalence possibly in the sealant sheet, that is, the epoxy/thiol ratio of the sealant sheet. The sealant sheet's epoxy/thiol ratio value can be, for instance, about 0.1 or greater and 10 or less, 0.2 or greater and 5 or less, 0.3 or greater and 3 or less, or even 0.5 or greater and 2 or less. When the epoxy/thiol ratio is at or above an aforementioned lower limit and at or below an aforementioned upper limit, the resulting cured material tends to combine well-balanced strength and stretchiness. In some embodiments, the epoxy/thiol ratio can be, for instance, 0.6 or greater, 0.7 or greater, or 0.8 or greater; and 1.7 or less, 1.5 or less, or 1.2 or less.

In the type (I) sealant sheet, the amount of the thiol compound (C) possibly in the sealant sheet is not particularly limited. The amount of the thiol compound (C) in the sealant sheet can be selected, for instance, to obtain an aforementioned epoxy/thiol ratio. In some embodiments, the amount of the thiol compound (C) relative to 100 parts by weight of the epoxy group-containing polysulfide polymer (AB) can be, for instance, 0.05 part by weight or greater, 0.1 part by weight or greater, 0.3 part by weight or greater, or even 0.5 part by weight or greater; and it can be, for instance, 10 parts by weight or less, 5 parts by weight or less, 3 parts by weight or less, or even 1 part by weight or less.

In the type (II) sealant sheet, the amount of the epoxy compound (B) possibly in the sealant sheet is not particularly limited. The amount of the epoxy compound (B) in the sealant sheet can be selected, for instance, to obtain an aforementioned epoxy/thiol ratio. In some embodiments, the amount of the epoxy compound (B) relative to 100 parts by weight of the thiol group-containing polysulfide polymer (AC) can be, for instance, 0.05 part by weight or greater, 0.1 part by weight or greater, 0.3 part by weight or greater, 0.5 part by weight or greater, or even 1 part by weight or greater; and it can be, for instance, 15 parts by weight or less, 10 parts by weight or less, or even 5 parts by weight or less.

<Photo-Reaction Catalyst>

The photo-curable sealant sheet disclosed herein preferably comprises one, two or more species among various photo-reaction catalysts capable of helping initiate or accelerate the photo-reaction by photoirradiation. Such a photo-reaction catalyst may be called a photo-reaction initiator or photo-polymerization initiator. Favorable examples of the photo-reaction catalyst include a photobase generator (D).

<Photobase Generator (D)>

In some preferable embodiments, the sealant sheet comprises a photobase generator (D). As the photobase generator (D), a species that generates a base upon photoirradiation is used. Examples of the photobase generator include α-aminoacetophenone compounds; oxime ester compounds; compounds having substituents such as acyloxyimino groups, N-formylated aromatic amino groups, N-acylated aromatic amino groups, nitrobenzyl carbamate groups and alkoxybenzyl carbamate groups; compounds having biguanidic cations. A preferable α-aminoacetophenone in particular has two or more nitrogen atoms. For the photobase generator, solely one species or a combination of two or more species can be used.

As the photobase generator, a commercial product can be used as well. Commercial photobase generators include product names WPBG-018 (9-anthramethyl N,N'-diethylcarbamate), WPBG-027 ((E)-1-[3-(2-hydroxyphenyl)-2-propenoyl]piperidine), WPBG-082 (guanidium 2-(3-benzoylphenyl)propionate), WPBG-140 (1-(anthraquinon-2-yl) ethyl imidazole carboxylate), WPBG-266 (1,2-diisopropyl-3-[bis(dimethylamino)methylene]guanidium 2-(3-benzoylphenyl)propionate), WPBG-300 (1,2-dicyclohexyl-4,4,5,5-tetramethylbiguanidium n-butyltriphenylborate) and WPBG-345 (1,2-dicyclohexyl-4,4,5,5-tetramethylbiguanidium tetrakis(3-fluorophenyl)borate) available from Wako Pure Chemical Corporation.

Among these, ionic photobase generators having biguanidic cations are preferable for their abilities to effectively accelerate the anionic addition reaction between epoxy and thiol groups by generating a base upon photoirradiation. Examples of biguanidic cations include alkylbiguanidinium, cycloalkylbiguanidinium, and cycloalkyl-alkylbiguadinium. In a photobase generator, the anion paired with the biguanidic cation can be, for instance, a borate-based anion. Commercial products of this type of photobase generator include the aforementioned WPBG-300 and WPBG-345. Other examples of the anion paired with the biguanidic cation in the photobase generator include carboxylate-based anions. As a commercial product of this type of photobase generator, the aforementioned WPBG-266 can be preferably used.

The amount of the photobase generator to be used can be selected to obtain desirable effects of its use. In some embodiment, the amount of the photobase generator used can be, for instance, 0.01 part by weight or greater relative to 100 parts by weight of the total amount of the epoxy group-containing polysulfide polymer (AB) and the thiol compound (C) (in case of a type (I) sealant sheet) or of the total amount of the thiol group-containing polysulfide polymer (AC) and the epoxy compound (B) (in case of a type (II) sealant sheet). From the standpoint of enhancing the curing properties of the sealant sheet, it is preferably 0.03 part by weight or greater, possibly 0.07 part by weight or greater, or even 0.1 part by weight or greater. From the standpoint of the raw material costs, etc., the amount of the photobase generator used to 100 parts by weight of the total amount is usually preferably 3 parts by weight or less, more preferably 2 parts by weight or less, possibly 1 part by weight or less, 0.7 part by weight or less, 0.5 part by weight or less, or even 0.3 part by weight or less.

<Photosensitizer>

The sealant sheet disclosed herein may include a sensitizer. The use of the sensitizer can increase the utilization efficiency of the irradiated light and improve the sensitivity of the photo-reaction catalyst (e.g., a photobase generator (D)). As a photosensitizer, a suitable species can be selected and used among known materials. Non-limiting examples of the photosensitizer include benzophenone and benzophenone derivatives such as 4-methylbenzophenone, 3-benzoylbiphenyl, 4-(4-methylphenylthio)benzophenone, methyl 2-benzoyl benzoate, 4-phenylbenzophenone, 4,4'-bis(dimethoxy)benzophenone, 4,4'-bis(dimethylamino)benzophenone, 4,4'-bis(diethylamino)benzophenone, methyl-2-benzoylbenzoate, 2-methylbenzophenone, 3-methylbenzophenone, 3,3'-dimethyl-4-methoxybenzophenone and 2,4,6-trimethylbenzophenone; thioxanthone, xanthone and thioxanthone derivatives such as 2-chlorothioxanthone, 4-chlorothioxanthone, 2-isopropylthioxanthone, 4-isopropylthioxanthone, 2,4-dimethylthioxanthone, 2,4-diethylthioxanthone, 1-chloro-4-propoxythioxanthone and 2,4-diethylthioxanthen-9-one; fluorene-based compounds such as 2-hydroxy-9-fluorenone; anthrone and anthrone derivatives such as dibenzosuberone and 2-amino-9-fluorenone; anthraquinone and anthraquinone derivatives such as 2-ethylanthraquinone, 2-hydroxyanthraquinone and 2-aminoanthraquinone; naphthalene derivatives such as 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, 1-methoxynaphthalene, 2-methoxynaphthalene, 1,4-dicyanonaphthalene and methyl 3-hydroxy-2-naphthol; anthracene and anthracene derivatives such as 1,2-benzanthracene, 9,10-dichloroanthracene, 9,10-dibromoanthracene, 9,10-diphenyl anthracene, 9-cyanoanthracene, 9,10-dicyanoanthracene and 2,6,9,10-tetracyanoanthracene; nitro compounds such as nitrobenzoate and nitroaniline; and various pigments; but it is not limited to these.

When using a photosensitizer, it can be used in an amount selected to obtain a desirable sensitizing effect. In some embodiments, relative to 100 parts by weight of the total amount of epoxy compound (B) and thiol compound (C), the amount of photosensitizer used can be, for instance, 0.001 part by weight or greater, 0.005 part by weight or greater, 0.01 part by weight or greater, or even 0.05 part by weight or greater. The maximum amount of photosensitizer is not particularly limited. From the standpoint of the curing rate control and storability of the sealant sheet, it is usually suitably 10 parts by weight or less, possibly 5 parts by weight or less, 1 part by weight or less, 0.5 part by weight or less, or even 0.3 part by weight or less.

<Storage Stabilizer>

The sealant sheet disclosed herein may further include an optional compound that is useful in inhibiting the photocuring reaction as far as other properties are not greatly impaired. The use of such a compound can enhance the storability of the sealant sheet prior to use. Examples of storage stabilizer include organic acids, inorganic acids as well as oligomers, polymers, borates and phosphates having acidic groups in the molecules, with them being liquids or solids at room temperature and possibly having non-acidic functional groups. Examples include, but are not limited to, sulfuric acid, acetic acid, adipic acid, tartaric acid, fumaric acid, barbituric acid, boric acid, pyrogallol, phenol resin and a carboxylic acid anhydride. For the storage stabilizer, solely one species or a combination of two or more species can be used. The amount of storage stabilizer used is not particularly limited and can be selected to obtain desirable effects.

Favorable examples of the storage stabilizer include boric acid esters and phosphoric acid esters.

Boric acid esters are liquids or solids at room temperature. Examples include, but are not limited to, trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate and triethanolamine borate.

Phosphoric acid esters include, but are not limited to, ethyl phosphate, butyl phosphate, propyl phosphate, 2-ethylhexyl phosphate, dibutyl phosphate, di-(2-ethylhexyl) phosphate, oleyl phosphate and ethyl diethyl phosphate.

<Filler>

To the sealant sheet disclosed herein, a filler can be added as necessary. This may improve either one or both between the breaking strength and the elongation at break of the cured material. The filler may be useful in adjusting the storage modulus of the sealant sheet. With the filler suitably used, the shape-holding properties and ease of processing of the sealant sheet may be improved. The filler used is not particularly limited. Any of a suitable filler can be used as long as the effect obtainable by the art disclosed herein is not greatly impaired. As the filler, solely one species or a combination of two or more species can be used.

Examples of the material forming the filler include, but are not limited to, talc, silica, glass, carbon black, alumina, clay, mica, aluminum hydroxide, magnesium hydroxide, calcium carbonate, magnesium carbonate, barium sulfate, titanium dioxide, barium titanate, strontium titanate, calcium titanate, magnesium titanate, bismuth titanate, boron nitride, aluminum borate, barium zirconate and calcium zirconate. Particularly preferable examples include talc, silica, glass and calcium carbonate.

The amount of filler to be included is not particularly limited and can be selected to obtain favorable properties. The filler content can be, for instance, 1% by weight or more of the entire sealant sheet, or also 5% by weight or more. From the standpoint of obtaining greater effect of the use, it can be 10% by weight or more, 15% by weight or more, 20% by weight or more, or even 25% by weight or more. The filler content can be, for instance, below 50% by weight of the entire sealant sheet. From the standpoint of the ease of forming the sheet shape and increasing the stretchiness of the cured material, it is usually suitably below 40% by weight, or possibly even below 35% by weight. In some embodiments, the filler content can be below 30% by weight, or even below 25% by weight.

The mean particle diameter of the filler is not particularly limited. The mean particle diameter is usually suitably 100 µm or less, or preferably 50 µm or less. A smaller mean particle diameter tends to bring a greater effect in improving either or both between the breaking strength and the elongation at break of the cured material. In some embodiments, the filler may have a mean particle diameter of, for instance, 30 µm or less, 20 µm or less, 15 µm or less, 10 µm or less, or even 5 µm or less. The filler's mean particle diameter can be, for instance, 0.1 µm or greater, 0.2 µm or greater, 0.5 µm or greater, or even 1 µm or greater. From the standpoint of the handling properties and dispersibility of the filler, it may be advantageous that the mean particle diameter is not excessively small.

As used herein, the mean particle diameter of the filler refers to the 50th percentile particle diameter by volume (50% median diameter) in a size distribution obtained by laser scattering/diffraction method analysis.

In some embodiments, a filler formed of a material having a refractive index in the range of 1.56 or higher and below 1.62 can be used. For instance, a glass filler having a refractive index in this range can be used. The refractive index range is exactly or approximately equal to the refractive index (typically about 1.60) of polysulfide polymer (A). Thus, with a filler having a refractive index in the range, the decrease in transmittance of the sealant sheet due to the filler content tends to be smaller as compared with a filler having a refractive index outside the range. With the sealant sheet having a certain level of transmittance, the sealed area is easily observed through the sealant sheet. This can be advantageous also from the standpoint of the ease of placement, etc., when placing the sealant sheet in a designated area.

In the sealant sheet disclosed herein, it is possible to use a filler (e.g., glass filler) having a refractive index in the range of 1.56 or higher and below 1.62 and a filler (e.g., talc) having a refractive index outside the range together. The ratio of the filler having a refractive index in the range to the total amount of the filler(s) in the sealant sheet is, for instance, possibly 10% by weight or higher, also 25% by weight or higher, preferably 45% by weight or higher, yet also possibly 60% by weight or higher, or 85% by weight or higher; or it can be even 100% by weight. In some embodiments, it is preferable to use a filler formed of a material having a refractive index in the range of 1.56 or higher and 1.61 or lower or in the range of 1.57 or higher and 1.60 or lower. The refractive index can be determined, using generally known techniques such as minimum deviation, critical angle and V-block methods. The measurement can be performed using, for instance, a multi-wavelength Abbe refractometer DR-M4 (available from ATAGO Co., Ltd.). Alternatively, nominal values given in a catalog, literature, etc., can be used as well.

The sealant sheet disclosed herein may include other optional components as long as the effect obtainable by the art disclosed herein is not greatly impaired. Examples of such optional components include, but are not limited to, colorants such as dyes and pigments, dispersing agent, plasticizer, softener, flame retardant, anti-aging agent, UV absorber, antioxidant, and photo-stabilizer.

The sealant sheet disclosed herein may include other polymer or oligomer (or optional polymer, hereinafter) besides those described above, for instance, to increase the tightness of adhesion to the target area to be sealed, etc. From the standpoint of the oil resistance of the cured material, the optional polymer content is preferably 10 parts by weight or less, more preferably 5 parts by weight or less, or yet more preferably 1 part by weight or less, relative to 100 parts by weight of the polysulfide polymer (A). The sealant sheet may be essentially free of such an optional polymer. In this description, being essentially free of a certain component means that the component is not included at least intentionally, unless otherwise noted.

In the sealant sheet disclosed herein, the organic solvent content thereof can be, for instance, 5% by weight or less, 2% by weight or less, 1% by weight or less, or even 0.5% by weight or less; or it can be essentially free of an organic solvent. The organic solvent content can be 0%. The organic solvent refers to a component that is not supposed to react with other components (especially the epoxy group-containing polysulfide or a curing agent possibly used as necessary) in the sealant sheet, such as toluene, cyclohexanone and trichloroethane.

The type (I) sealant sheet may comprise a thiol compound (C) (or a lower thiol compound, hereinafter) having a Mw of 1000 or lower, preferably 600 or lower, or more preferably 400 or lower. Of the total amount of the entire thiol compound (C) and the epoxy group-containing polysulfide polymer (AB), the amount by weight of the lower thiol compound can be, for instance, 0.1% by weight or greater, 0.3% by weight or greater, or even 0.5% by weight or greater. The lower thiol compound may serve to increase the tack of the sealant sheet disclosed herein. When the tack of the sealant sheet is increased, for instance, the sealant sheet placed in a target area to be sealed may show greater temporary fixing properties to the target area. The temporary fixing properties refer to properties that inhibit the sealant sheet from lifting off or shifting in position from the target area to be sealed until the sealant sheet placed in the target area cures. Upon photoirradiation, the lower thiol compound reacts to be incorporated into the cured material. In some embodiments, of the total amount of the entire thiol compound (C) and the epoxy group-containing polysulfide polymer (AB), the amount by weight of the lower thiol compound can be below 0.1% by weight, below 0.05% by weight, or even essentially none. Even in such an embodiment, the sealant sheet disclosed herein has surface tack and can be temporarily fixed to an area to be sealed.

The type (II) sealant sheet may comprise an epoxy compound (B) (or a lower epoxy compound, hereinafter) having a Mw of 1000 or lower, preferably 600 or lower, or more preferably 400 or lower. Of the total amount of the entire epoxy compound (B) and the thiol group-containing polysulfide polymer (AC), the amount by weight of the lower epoxy compound can be, for instance, 0.1% by weight or greater, 0.3% by weight or greater, or even 0.5% by weight or greater. Similar to the lower thiol compound, the lower epoxy compound may serve to increase the tack of the sealant sheet disclosed herein. In some embodiments, of the total amount of the entire epoxy compound (B) and the thiol group-containing polysulfide polymer (AC), the amount by weight of the lower epoxy compound can be below 0.1% by weight, below 0.05% by weight, or even essentially none. Even in such an embodiment, the sealant sheet disclosed herein may have surface tack and can be temporarily fixed to a target area to be sealed.

<Support Substrate>

The sealant sheet disclosed herein may have a support substrate. Such a sealant sheet may have a support substrate and a seal layer placed on at least one face (e.g., each face) of the support substrate. The seal layer is formed from a material capable of forming the sealant sheet. Such an on-support-substrate (substrate-supported) sealant sheet tends to have excellent processability and applicability to target objects as well as great handling properties.

Non-limiting examples of the support substrate material include various kinds of resin film such as polyolefin film formed of polyethylene (PE), polypropylene (PP) or like, polyester film formed of polyethylene terephthalate (PET), fluororesin film formed of polytetrafluoroethylene (PTFE) or like, polyvinyl chloride film, etc.; woven and nonwoven fabrics of single or blended spinning of various fibrous materials (possibly natural fibers such as hemp and cotton, synthetic fibers such as polyester and vinylon, semi-synthetic fibers such as acetate, etc.). It can be a layered body as a composite of these. As the support substrate, it is preferable to use a species comprising a self-shape-retaining (self-standing or independent) resin film as base film. In particular, polyester film such as PET film is preferable. It is noted that the term "resin film" refers to void-free resin film that has a non-porous structure and is typically essentially free of pores. Thus, the concept of resin film is distinct from foam film and nonwoven fabric. The resin film may have a monolayer structure or a multilayer structure with two or more layers. The resin film may be unstretched or stretched (e.g., uniaxially stretched or biaxially stretched).

To the support substrate (e.g., resin film), known additives can be added as necessary, such as photostabilizer, antioxidant, antistatic agent, colorant (dye, pigment, etc.), filler, slip agent and anti-blocking agent. The amount of an additive used is not particularly limited and can be suitably selected in accordance with the purpose, etc.

In an embodiment having a support substrate, the support substrate may have a transmittance, for instance, above 5%. It can also be above 10%, above 15%, or even above 20%. From the standpoint of the curing properties by photoirradiation, it is suitably 50% or higher, preferably 70% or higher, or possibly 90% or higher. The support substrate's maximum transmittance is not particularly limited and can be 100%. From a practical standpoint, it can be 80% or lower, 60% or lower, or even 40% or lower. The support substrate disclosed herein can also be implemented in an embodiment having a transmittance of 30% or lower, 20% or lower, or 15% or lower. The transmittance is determined by the same method as the sealant sheet transmittance measurement method.

The support substrate's thickness is not particularly limited and can be selected in accordance with the purpose, application, etc. The support substrate may have a thickness of, for instance, about 1000 μm or less, or about 300 μm or less. From the standpoint of the curing properties by photoirradiation, it is suitably about 100 μm or less, preferably about 80 μm or less, possibly about 50 μm or less, about 30 μm or less, or even 15 μm or less. With decreasing thickness of the support substrate, the sealant sheet's flexibility and conformability to surface structures of target objects tend to improve. From the standpoint of the ease of handling, processing and like, the support substrate can have a thickness of, for instance, 1 µm or greater, 2 µm or greater, 5 µm or greater, or even 10 µm or greater. In some embodiments, the support substrate has a thickness of preferably 20 µm or greater (e.g., 25 µm or greater), more preferably 30 µm or greater, possibly 50 µm or greater, or even 70 µm or greater.

<Method for Producing Sealant Sheet>

Described below are embodiments of the sealant sheet production method disclosed herein. It is noted that the following description is for illustration purposes and does not limit the method for producing the sealant sheet disclosed herein. For instance, for the convenience of description, embodiments using photobase generators and fillers are described below; however, the sealant sheet disclosed herein is not to be limited to embodiments comprising these components.

The type (I) sealant sheet comprises an epoxy group-containing polysulfide polymer (AB) and a thiol compound (C) (e.g., an aforementioned lower thiol compound) together. The sealant sheet having such a composition can be produced, for instance, by a method that comprises obtaining an epoxy group-containing polysulfide polymer (AB); adding and mixing a thiol compound (C), a photobase generator (D) and a filler with the epoxy group-containing polysulfide polymer (AB); and molding the resulting mixture into a sheet shape. When the epoxy group-containing polysulfide polymer (AB) is a reaction product of a thiol group-containing polysulfide, a bifunctional epoxy compound and a polyfunctional epoxy compound, the step of obtaining the mixture may include, in the following order, preparing the reaction product of the thiol group-containing polysulfide, the bifunctional epoxy compound and the polyfunctional epoxy compound; and adding and mixing a thiol compound (C), a photobase generator (D) and a filler with the reaction product. Alternatively, the filler can be mixed together when preparing the reaction product.

The type (II) sealant sheet comprises a thiol group-containing polysulfide polymer (AC) and an epoxy compound (B) (e.g., an aforementioned lower epoxy compound) together. The sealant sheet having such a composition can be produced, for instance, by a method that comprises obtaining a thiol group-containing polysulfide polymer (AC); adding and mixing an epoxy compound (B), a photobase generator (D) and a filler with the thiol group-containing polysulfide polymer (AC); and molding the resulting mixture into a sheet. When the thiol group-containing polysulfide polymer (AC) is a thiol modification product of an epoxy group-containing polysulfide polymer, the step of obtaining the mixture may include, in the following order, preparing the thiol group-containing polysulfide polymer (AC) by allowing thiol groups of a compound having two or more thiol groups per molecule to react with epoxy groups of the epoxy group-containing polysulfide polymer (AB); and adding and mixing an epoxy compound (B), a photobase generator (D) and a filler with the thiol group-containing polysulfide polymer (AC). Alternatively, the filler can be mixed together when preparing the reaction product.

With respect to the preparation of the reaction product, the description above may apply. Thus, a redundant description is omitted. As for a system that can be used for mixing the reaction product and added components, examples include, but are not limited to, sealed mixing machines or batch mixing machines such as Banbury mixer, kneader, two-roller mill and three-roller mill; and continuous mixing machines such as single-screw extruder and two-screw extruder.

As the method for molding the mixture into a sheet, a single method or a combination of methods can be employed among known sheet forming methods such as press-molding, calender molding and hot-melt extrusion. The press-molding can be normal pressing or vacuum pressing. From the standpoint of preventing the sheet from trapping air bubbles and inhibiting thermal denaturation of the mixture, in some embodiments, vacuum pressing or calender molding can be preferably applied. For instance, the resulting sealant sheet can be layered on a release liner to form a release-linered sealant sheet shown in FIG. 1 or FIG. 2. Alternatively, the sheet can be formed by applying the mixture onto a release liner or support substrate with a conventional coater such as a gravure roll coater. The on-support-substrate (substrate-supported) sealant sheet can be made into a release-linered sealant sheet by layering a release liner on the surface. The resulting sealant sheet can be then subjected, in this form, to storage, processing (e.g., slit processing into a prescribed width, processing a roll into flat sheets, punching out prescribed shapes, etc.), transportation, etc.

<Release Liner>

The photo-curable sealant sheet used in the method disclosed herein can be in the form of a release-linered sealant sheet having a release liner layered on the surface. By this, the surface of the sealant sheet is protected with the release liner, thereby preventing deformation by external forces and contamination such as dirt accumulation. The sealant sheet can be handled while being layered on the release liner and can be applied to a target object while being layered on the release liner. Such a release-linered sealant sheet has excellent handling properties and quality retention, and can be placed easily and precisely in a desirable area.

The release liner is not particularly limited. Examples include a release liner having a release layer on the surface of a release liner substrate and a release liner formed from low-adhesive resin film (polyolefinic resin film, fluororesin film) such as a fluoropolymer (PTFE, etc.) and polyolefinic resin (PE, PP, etc.).

As the release liner disclosed herein, it is preferable to use a species having a release layer on a release liner substrate. The release layer may be formed by subjecting the release liner substrate to surface treatment with a release agent. The release agent can be a known release agent such as silicone-based release agent, long-chain alkyl-based release agent, fluorine-based release agent or molybdenum(IV) sulfide. In some embodiments, it is preferable to use a release liner having a release layer formed with a silicone-based release agent. The release layer's thickness or formation method is not particularly limited and can be selected to obtain suitable release properties on the release liner's release face.

As the release liner substrate, various kinds of plastic film can be preferably used. As used herein, the plastic film is typically a non-porous sheet and conceptually distinct from, for instance, nonwoven fabric (i.e., conceptually excludes nonwoven fabric).

Examples of the plastic film material include polyester-based resins such as PET and polyolefinic resins such as PE and PP. It is possible to use a release liner substrate formed from one species or a mixture of two or more species among these resins. A particularly preferable release liner substrate is polyester-based film (e.g., PET film) formed from a polyester-based resin.

The plastic film used as the release liner substrate can be unstretched film, uniaxially stretched film or biaxially stretched film. The plastic film may have a monolayer structure or a multilayer structure including two or more sublayers. The plastic film may include known additives that can be used in release liner substrates, such as antioxidant, anti-aging agent, heat-resistant stabilizer, photostabilizer, UV absorber, colorant such as pigment and dye, slip agent, filler, antistatic agent and nucleating agent. In a multilayer plastic film, each additive can be included in all or just some of the sublayers.

In an embodiment where the sealant sheet has the first and second release liners on the respective faces, the first and second release liners can be identical in materials and composition or different in materials and/or composition.

The release-linered sealant sheet disclosed herein is a separable laminate of a release liner and a sealant sheet. Thus, the peel strength of the release liner to the sealant sheet is preferably limited up to a prescribed value. In some preferable embodiments, the release liner has a peel strength of about 3 N/50 mm or less, more preferably 1 N/50 mm or less, 0.70 N/50 mm or less, or even 0.50 N/50 mm or less. The minimum peel strength of the release liner is suitably 0.01 N/50 mm or greater. From the standpoint of providing protection with the release liner and preventing its lifting, it can be 0.05 N/50 mm or greater. The release liner's peel strength can be adjusted by release treatment on the release liner surface, etc. In an embodiment having the first and second release liners on the respective faces of the sealant sheet, the release liners preferably have different peel strengths in view of removal works. Alternatively, they may be designed to have comparable values.

The release liner's peel strength is determined with a 150 mm long, 50 mm wide piece cut out of the release-linered sealant sheet, at a tensile speed of 300 mm/min at a peel angle of 180° in an atmosphere at 23° C. and 50% RH.

The release liner's thickness is not particularly limited and can be about 10 µm to 500 µm. From the standpoint of the release liner's strength and handling properties, the release liner has a thickness of suitably 20 µm or greater (e.g., 25 µm or greater), preferably 30 µm or greater, possibly 35 µm or greater, 40 µm or greater, 45 µm or greater, 50 µm or greater, 70 µm or greater. The release liner having a large thickness is advantageous from the standpoint of preventing deformation of the sealant sheet applied on the target object as well. From the standpoint of the release liner's handling properties (e.g., ease of winding), etc., the release liner has a thickness of suitably 300 µm or less, preferably 200 µm or less, more preferably 150 µm or less, yet more preferably 100 µm or less, particularly preferably 80 µm or less, possibly 50 µm or less, or even 30 µm or less. With a thin release liner, when applying the sealant sheet laminated with the release liner to a target object, it tends to show excellent conformability to the surface structure of the target object. In an embodiment having the first and second release liners on the respective faces of the sealant sheet, the thicknesses of the first and second release liners are preferably different in view of removal works; or they can be the same.

The release liner's thickness can be specified in relation to the sealant sheet's thickness. From the standpoint of efficiently photo-curing the sealant sheet, the ratio ($T_R/T_S$) of thickness $T_R$ of release liner (in particular, the photoirradiation-side release liner) to thickness $T_S$ of sealant sheet is, for instance, suitably about 1 or lower, preferably about 0.5 or lower, or possibly about 0.3 or lower. A constitution satisfying the $T_R/T_S$ ratio tends to show excellent conformability to the surface structure of a target object when the sealant sheet is applied along with the laminated release liner to the target object. The minimum $T_R/T_S$ ratio value is suitably, for instance, about 0.01 or higher. From the standpoint of the handling properties, etc., it is preferably about 0.05 or higher, possibly about 0.1 or higher, or even 0.15 or higher.

The release liner forming the release-linered sealant sheet used in the method disclosed herein can be translucent or non-translucent. As used herein, unless otherwise noted, the term "translucent" means that the light transmittance in the 350-450 nm wavelength range is 20% or higher, for instance, 50% or higher. As used herein, unless otherwise noted, the term "non-translucent" means that the light transmittance in the 350-450 nm wavelength range is below 20%, or preferably below 10%. In an embodiment having the first and second release liners on the respective faces of the sealant sheet, the light transmittance of the first release liner can be the same as or different from that of the second release liner.

The light transmittance of a release liner in the 350-450 nm wavelength range is determined by the method described later in Examples. In this Description, for convenience, the value at 365 nm wavelength can be used as the light transmittance (365 nm wavelength) of the release liner.

The release liner's light transmittance can be adjusted by a selection of release liner substrate material (resin material), additive species (e.g., colorant such as pigment) and their amounts, a selection of release agent, etc.

When through-liner photoirradiation is expected for the sealant sheet, from the standpoint of the sealant sheet's curing properties by through-liner photoirradiation, the release liner's light transmittance in the 350-450 nm wavelength range is preferably 25% or higher, more preferably 30% or higher, yet more preferably 35% or higher, possibly 50% or higher, 70% or higher, 90% or higher, 95% or higher, or even 99% or higher. In some embodiments, at least the release liner placed on the photoirradiation side may have such a light transmittance. In an embodiment having two release liners on the respective faces of the sealant sheet, the two release liners may have such light transmittance values or only one (the photoirradiation side) may have such a light transmittance. The maximum light transmittance is 100%. From a practical standpoint, it can be below 100%.

In some embodiments, from the standpoint of the visibility, it is preferable to use a release liner having a light transmittance of 80% or lower. Such a release liner allows easy confirmation of its presence on a sealant sheet. For instance, upon application of the sealant sheet to a target object, it can prevent forgetting of release liner removal. From such a standpoint, the light transmittance can be 75% or lower, 70% or lower, or even 65% or lower.

Herein, that the release liner has at least the prescribed light transmittance means that it has such a light transmittance in a major area (more than 50%, e.g., 70% or more) of the entire area laminated with the sealant sheet. When the sealant sheet is to be subjected to through-liner photoirradiation, from the standpoint of uniform and efficient photo-curing of the sealant sheet, the release liner preferably has the light transmittance in essentially the entire area of the release liner surface. Here, "essentially the entire area of the release liner surface" means that in the release liner surface, with the entire area laminated with the sealant sheet being 100%, the ratio of the area not having the light transmittance (e.g., due to placement of prints, etc.) is less than 5% of the entire area. The ratio of the area not having the light transmittance can be below 3%, or even below 1%. In other embodiments, in the release liner surface, the ratio of the area not having the light transmittance to the entire area laminated with the sealant sheet can be suitably selected in a range (e.g., <~30%, or even <~10%) that does not inhibit curing of the photo-curable sealant sheet.

The release-linered sealant sheet disclosed herein may comprise a non-translucent release liner as a component. When the sealant sheet is stored as a release-linered sealant sheet, this may help enhance the storability (e.g. inhibition of curing caused by light exposure during storage). A preferable non-translucent release liner has a light transmittance below 10% in the 350-450 nm wavelength range, more preferably below 5%, or yet more preferably below 1%. The minimum light transmittance of the non-translucent release liner is 0%; from a practical standpoint, it can be, for instance, 0.1% or higher.

When the release-linered sealant sheet disclosed herein comprises a translucent release liner and the sealant sheet is subjected to through-liner photoirradiation, for even curing of the sealant sheet, the release liner preferably has a uniform light transmittance in essentially the entire area of the release liner surface. For instance, in the release liner surface, the light transmittance of the entire area laminated with the sealant sheet is preferably within a 10% (e.g., 5%) range. By this, an evenly cured sealant can be preferably obtained by through-liner photoirradiation.

When the release-linered sealant sheet disclosed herein comprises a non-translucent release liner, to evenly obtain the effect of light blocking to enhance the storability of the sealant sheet, the release liner preferably has a uniform light transmittance in essentially the entire area of the release liner surface. For instance, in the release liner surface, the light transmittance of the entire area laminated with the sealant sheet is preferably within a 10% (e.g., 5%) range.

The release liner having a desirable light transmittance can be preferably prepared by using a suitable colorant. As the colorant, heretofore known pigments and dyes can be used. As a pigment, a species that is likely to bring about a certain transmittance is preferably used, for instance, among inorganic pigments such as zinc carbonate, zinc oxide, zinc sulfide, talc, kaolin, calcium carbonate, titanium oxide, silica, lithium fluoride, calcium fluoride, barium sulfate, alumina, zirconia, iron oxide-based, iron hydroxide-based, chromium oxide-based, chromium hydroxide-based, spinel calcinate-based, chromic acid-based, chromium vermilion-based, iron blue-based, cobalt blue-based, aluminum powder-based, bronze powder-based, silver powder-based and calcium phosphate pigments; and organic pigments such as phthalocyanine-based, azo-based, condensed azo-based, azo lake-based, anthraquinone-based, perylene-perinone-based, flavone, indigo-based, thioindigo-based, isoindolinone-based, azomethine-based, dioxazine-based, quinacridone-based, aniline black-based, triphenylmethane-based, and carbon black-based pigments. As a dye, a species that is likely to bring about a certain transmittance is preferably used, for instance, among azo-based dyes, anthraquinone, quinophthalone, styryl, diphenylmethane, triphenylmethane, oxazine, triazine, xanthan, methane, azomethine, acridine, and diazine. For the colorant, solely one species or a suitable combination of two or more species can be used.

The light transmittance can be obtained with the inclusion of a suitable colorant in a layer (release liner substrate, release layer or other arbitrary layer) that constitutes the release liner. In some preferable embodiments, the release liner substrate includes the colorant.

Although no particular limitations are imposed, the release liner disclosed herein having a light transmittance in the prescribed range may have at least the prescribed light transmittance while having one, two or more colors, for instance, black, gray, white, red, blue, yellow, green, yellow-green, orange, purple, gold, silver and pearl. From the standpoint of the visibility, it preferably has a color of gray, red, blue, yellow, green, yellow-green, orange or purple. From the standpoint of combining visibility and transparency for photo-curing, it more preferably has a color of blue or green. A blue color is particularly preferable.

In the art disclosed herein, the color blue has a wavelength of visible spectrum ranging from 360 nm or greater and less than 480 nm. The color green has a wavelength of visible spectrum ranging from 480 nm or greater and less than 560 nm.

<Applications (Usages)>

There are no particular limitations to the material of the area to be sealed by applying the art disclosed herein. The material can be, for instance, a metal, a resin, a composite material of these, etc. More specific examples include metal and metalloid materials such as iron, iron alloys (carbon steel, stainless steel, chromium steel, nickel steel, etc.), aluminum, aluminum alloys, nickel, tungsten, copper, copper alloys, titanium, titanium alloys and silicon; resin materials such as polyolefin resins, polycarbonate resins, acrylic resins, and acrylonitrile resins (PAN); ceramic materials such as alumina, silica, sapphire, silicon nitride, tantalum nitride, titanium carbide, silicon carbide, gallium nitride, and plaster; glass materials such as aluminosilicate glass, soda lime glass, soda aluminosilicate glass, and quartz glass; and laminates and composites of these. Favorable examples of the metal and metalloid materials include light metals such as aluminum and titanium as well as alloys comprising the light metals as primary components. Examples of an aluminum alloy include duralumin (e.g., duralumin A2024, duralumin A2017, etc.). Examples of the composites include carbon fiber reinforced plastic (CFRP) and glass fiber reinforced plastic (FRP). The art disclosed herein is preferably used on articles or parts having to-be-sealed areas formed from these materials.

The sealant sheet exists as a non-liquid (i.e. solid) sheet in a temperature range around 25° C.; and therefore, unlike a liquid sealant, it is unnecessary for a worker to control the thickness when placing it in a target area to be sealed. In addition, unlike a liquid sealant, the sealant sheet can be pre-cut to fit a desired external form and placed in the target area to be sealed (typically adhered with the tack of the sealant sheet). The sealant sheet can be subjected to photoirradiation after cut into the desired external form, or the post-photoirradiation sealant sheet can be cut into the desired outer shape during the usable time. Alternatively, the sealant sheet in a roll form can be applied to the target area while unwinding the roll and the remaining sealant sheet can be cut off. For instance, with a photoirradiation light source placed near the outlet port for the sealant sheet in roll form, the sealant sheet unwound from the roll can be pre-treated with photoirradiation and then applied to a target object. The use of the sealant sheet disclosed herein can fundamentally solve problems arising during liquid sealant application such as dripping, uneven application and excess spreading, significantly reducing the working time.

It is noted that until put to use (i.e., prior to photoirradiation), the sealant sheet is preferably stored in an area (dark area) where light that affects photo-curing is blocked or limited, such as a darkroom. The sealant sheet in storage can be in sheet form (possibly having a shape corresponding to the purpose, etc.) or roll form of a release-linered sealant sheet.

The sealant sheet disclosed herein undergoes curing by photoirradiation. While no particular limitations are imposed, in examples of preferable embodiments, upon photoirradiation, a base is generated from the photobase generator (D) and the anionic addition reaction is accelerated between epoxy and thiol groups in the sealant sheet, whereby the sheet undergoes curing. In other words, the art disclosed herein encompasses a method comprising a step of obtaining a release-linered sealant sheet having a photo-curable sealant sheet and a translucent release liner placed on at least one face of the sealant sheet; and a step of subjecting the sealant sheet to photoirradiation through the translucent release liner. According to such a method, with easy handling, the sealant sheet can efficiently undergo curing.

Photoirradiation can be performed, using a suitable known light source, for instance, a chemical lamp, a blacklight (e.g., a blacklight available from Toshiba Lighting & Technology Corporation) and a metal halide lamp. In some embodiments, a light source having a spectral power distribution in the wavelength range from 250 nm to 450 nm can be preferably used. A sensitizer can be included in the sealant sheet to increase the utilization efficiency of the light irradiated by the light source. For instance, when using a light source having a spectral power distribution in the wavelength range from 350 nm to 450 nm, the use of sensitizer is especially effective.

The art disclosed herein includes the sealant sheet's highly flexible setting of curing rates after curing treatment. For instance, the curing rate can be intentionally prolonged (prolonged-curing properties). Thus, the curing rate of the sealant sheet after curing treatment can be suitably selected; and photoirradiation can be carried out to allow the sealant sheet to undergo curing in a suitable timing in accordance with the curing rate. This means that the photoirradiation is not limited to a specific instance. For instance, the anionic addition reaction between epoxy and thiol groups may proceed slowly as compared with general radical polymerization; and therefore, the sealant sheet disclosed herein may gradually cure. In the sealing method disclosed herein, the sealant sheet pre-subjected to photoirradiation is placed in the area to be sealed. Thus, good curing can be obtained even when it is a sealant sheet used in a way where uniform irradiation with sufficient light is difficult to achieve after the sheet is placed in the area to be sealed (e.g., a sealant sheet used to seal opaque members together, etc.).

The cured material formed from the sealant sheet disclosed herein or the cured sealant has a tensile strength at break of suitably 0.7 MPa or greater, preferably 0.9 MPa or greater, more preferably greater than 1.0 MPa, possibly 1.1 MPa or greater, or even 1.15 MPa or greater, determined by the method described later in working examples. In some embodiments, the tensile strength at break can be 1.2 MPa or greater, or even 1.3 MPa or greater. The maximum tensile strength at break is not particularly limited. From the standpoint of readily obtaining other physical properties in combination, it can be, for instance, 3 MPa or less.

The cured material formed from the sealant sheet disclosed herein or the cured sealant has an elongation at break of suitably 100% or greater, preferably 120% or greater, possibly 150% or greater, 200% or greater, or even 250% or greater, determined by the method described below. The maximum elongation at break is not particularly limited. From the standpoint of readily obtaining other physical properties in combination, it can be, for instance, 600% or less, or even 400% or less.

(Measurement of Elongation at Break)

Using a blacklight available from Toshiba Lighting & Technology Corporation, one face of the sealant sheet is irradiated with light at 2000 mJ/cm². The irradiated sealant sheet is stored in an environment at 25° C. for 14 days. The resulting cured material (cured sealant) is then cut into a 10 mm wide, 50 mm long rectangle to prepare a sample piece. The sample piece thus prepared is clamped in the chuck of a tensile tester at a chuck distance of 20 mm. Based on JIS K6767, the sample piece is stretched at a rate of 50 mm/min. From the chuck distance (L1) at which the sample breaks and the initial chuck distance (L0) at the start of stretching, the elongation at break is determined by the next equation:

Elongation at break (%)=(($L1-L0$)/$L0$)×100

The matters disclosed in this description include the following:

(1) A sealing method comprising, in the following order,
a step of obtaining a photo-curable sealant sheet,
a step of subjecting the sealant sheet to photoirradiation, and
a step of applying the sealant sheet to a target object.

(2) The method according (1) above, using a prolonged-curing photo-curable sealant sheet as the sealant sheet.

(3) The method according to (1) or (2), using an anionic photo-curable sealant sheet as the sealant sheet.

(4) The method according to any of (1) to (3) above, wherein the application step is carried out before the sealant sheet has a 25° C. storage modulus above 0.7 MPa.

(5) The method according to any of (1) to (4) above, that uses, as the sealant sheet, a photo-curable sealant sheet having a 25° C. storage modulus of 0.7 MPa or less at one hour after the sealant sheet's exposed face is subjected to photoirradiation at 2000 mJ/cm² using a blacklight.

(6) The method according to any of (1) to (5) above, as the sealant sheet, using a photo-curable sealant sheet that forms a cured sealant having a tensile strength at break of 0.7 MPa or greater.

(7) The method according to any of (1) to (6) above, that uses, as the sealant sheet, a photo-curable sealant sheet having a pre-photoirradiation 25° C. storage modulus of 0.005 MPa or greater and 0.6 MPa or less.

(8) The method according to any of (1) to (7) above, as the sealant sheet, using a photo-curable sealant sheet formed of a polysulfide-based sealant.

(9) The method according to any of (1) to (8) above, as the sealant sheet, using a photo-curable sealant sheet comprising a photobase generator.

(10) A photo-curable sealant sheet that is used to carry out the method according to any of (1) to (9) above.

(11) The sealant sheet according to (10) above, the sealant sheet comprising the following components:
an epoxy group-containing polysulfide polymer (AB) having two or more epoxy groups per molecule,
a thiol compound (C) having two or more thiol groups per molecule, and
a photobase generator (D)

(12) The sealant sheet according to (11) above, wherein the epoxy group-containing polysulfide polymer (AB) is an epoxy-bi-terminated polysulfide.

(13) The sealant sheet according to (11) or (12) above, wherein the thiol compound (C) has a thiol equivalence of 45 g/eq or higher and 450 g/eq or lower.

(14) The sealant sheet according to (11) above, wherein the epoxy group-containing polysulfide polymer (AB) is a reaction product of a thiol-bi-terminated polysulfide having a disulfide structure in its main chain and having a Mw of 500 to 10000, and an epoxy compound having two or more epoxy groups per molecule.

(15) The sealant sheet according to (14) above, wherein the epoxy compound comprises a bifunctional epoxy compound.

(16) The sealant sheet according to (15) above, comprising, as the bifunctional epoxy compound, an epoxy compound having a five-membered or larger carbon ring structure in its molecule.

(17) The sealant sheet according to any of (14) to (16) above, wherein the epoxy compound comprises a trifunctional or higher polyfunctional epoxy compound.

(18) The sealant sheet according to (17) above, comprising a novolac epoxy resin as the polyfunctional epoxy compound.

(19) The release-linered sealant sheet according to (10) above, comprising the following components:
 a thiol group-containing polysulfide polymer (AC) having two or more thiol groups per molecule,
 an epoxy compound (B) having two or more epoxy groups per molecule, and
 a photobase generator (D)

(20) The sealant sheet according to (19) above, wherein the thiol group-containing polysulfide polymer (AC) is a thiol-bi-terminated polysulfide.

(21) The sealant sheet according to (19) or (20) above, wherein the epoxy compound (B) has an epoxy equivalence of 50 g/eq or higher and 600 g/eq or lower.

(22) The sealant sheet according to any of (11) to (21) above, wherein the photobase generator (D) is an ionic photobase generator having a biguanidic cation.

(23) The sealant sheet according to any of (11) to (22) above, further comprising a sensitizer.

(24) The sealant sheet according to any of (11) to (23) above, further comprising a filler.

(25) The sealant sheet according to (24) above, wherein the filler content is 1% by weight or more and less than 40% by weight of the entire sealant sheet.

(26) The sealant sheet according to (14)) or (25), wherein the filler has a mean particle diameter of 0.1 μm or greater and 30 μm or less.

(27) The sealant sheet according to any of (10) to (26) above, having a thickness of 0.01 mm or greater and 10 mm or less.

(28)
A release-linered sealant sheet comprising the sealant sheet according to any of (10) to (27) above and a release liner having a release face in contact with at least one face of the sealant sheet.

EXAMPLES

Several working examples related to the present invention are described below, but the present invention is not limited to these examples. In the description below, "parts" are by weight unless otherwise specified.

Production Example 1

Using a reaction vessel equipped with a stirrer, while stirring, were heated the following at 90° C. for 3 hours: 90 parts of a liquid polysulfide polymer (thiol-bi-terminated polysulfide polymer), 6.7 parts of a bifunctional epoxy compound, 2 parts of a polyfunctional epoxy compound and 0.01 part of a basic catalyst. Subsequently, the reaction mixture was transferred to a second vessel and stored in an environment at 50° C. for 168 hours. By this, was synthesized an epoxy-bi-terminated polysulfide.

The reaction mixture was removed from the second vessel and was allowed to cool to room temperature. Subsequently, were added 1 part of a secondary bifunctional thiol compound, 1 part of a photobase generator, 0.5 part of a storage stabilizer and 30 parts of talc as filler. The resulting mixture was evenly kneaded, using a two-roll mill. Using a vacuum presser, the resulting mixture was shaped into sheets to obtain sealant sheets according to this Example. Here, were prepared two kinds, a 0.2 mm thick sheet and a 1 mm thick sheet.

The materials used are as follows:
Liquid polysulfide polymer: product name THIOKOL LP-55 (available from Toray Fine Chemicals, thiol-bi-terminated polysulfide, Mw 4000)
Bifunctional epoxy compound: product name jER806 (available from Mitsubishi Chemical, bisphenol F epoxy resin, epoxy equivalence 177 g/eq)
Polyfunctional epoxy compound: product name jER152 (available from Mitsubishi Chemical, phenol novolac epoxy resin, epoxy equivalence 176-178 g/eq)
Basic catalyst: 2,4,6-triaminomethyl-phenol (available from Tokyo Chemical Industry)
Secondary bifunctional thiol compound: product name KARENZ MT BD1 (available from Showa Denko K. K., 1,4-bis(3-mercaptobutyryloxy)butane, thiol equivalence 147.2 g/eq)
Photobase generator: product name WPBG-266 (available from FUJIFILM Wako Pure Chemical, biguanidic photobase generator)
Storage stabilizer: product name CUREDUCT L-07N (available from Shikoku Chemicals, boric acid ester compound)
Filler (talc): product name MICRO ACE SG-95 (available from Nippon Talc Co., Ltd., mean particle diameter 2.5 μm)

The 0.2 mm thick sealant sheet was placed between two release liners to prepare a release-linered sealant sheet having a release liner on each face thereof. In particular, as the release liner placed on the photoirradiation side described later, was used a 50 μm thick release liner R1 (available from NIPPA Corporation) formed of PET film having a release face on one side and having a light transmittance of 64.2% at 365 nm wavelength. As the other release liner, was used a polyester release liner available from Mitsubishi Chemical Corporation.

(Determination of Initial Storage Modulus)

With respect to the resulting sealant sheet, the pre-photoirradiation storage modulus (initial storage modulus) was determined by the method shown below. As a result, the initial storage modulus of the sealant sheet was in the range of 0.02 MPa to 0.2 MPa.

[Measurement Method]

From the 1 mm thick sealant sheets, were punched out discs of 8 mm in diameter. Each disc was placed between parallel plates. Using a rheometer (model name ARES G2 available from TA Instruments Japan, Inc.), was determined the storage modulus G' at a measurement temperature of 25° C., at a frequency of 1 Hz, at 0.5% strain.

(Measurement of Post-Photoirradiation One-Hour Storage Modulus)

With respect to the resulting sealant sheet, by the method described below, the post-photoirradiation one-hour storage modulus was determined. As a result, the post-photoiradiation one-hour storage modulus of the sealant sheet was higher than the initial storage modulus and 0.5 MPa or less.

[Measurement Method]

In an environment at 25° C., using a blacklight available from Toshiba Lighting & Technology Corporation, photoirradiation was carried out at 2000 mJ/cm$^2$ on one side of the 1 mm thick sealant sheet. In the environment at 25° C., the post-photoirradiation sealant sheet was left still for one hour. Immediately after this, storage modulus G' was determined in the same manner as the measurement of initial storage modulus.

(Tensile Strength at Break of Cured Sealant)

From the resulting release-linered sealant sheet, was removed the photoirradiation-side release liner R1 to expose the surface of the sealant sheet (0.2 mm thick). Using a blacklight available from Toshiba Lighting & Technology Corporation, the exposed face was subjected to photoirradiation at 2000 mJ/cm².

The irradiated sealant sheet was stored in an environment at 25° C. for 14 days. The resulting cured material (cured sealant) was then cut into a 10 mm wide, 50 mm long rectangle to prepare a sample piece. The sample piece was clamped in the chuck of a tensile tester at a chuck distance of 20 mm. Based on JIS K6767, the sample piece was stretched at a rate of 50 mm/min and the maximum strength observed before the sample piece broke was recorded as the strength at break. As a result, the cured sealant was found to have a tensile strength at break of 1.5 MPa.

Production Example 2

As the photoirradiation release liner placed on the photoirradiation side described later, was used a release liner R2 (available from Mitsubishi Chemical Corporation, 38 μm thick, 91% light transmittance at 365 nm wavelength) formed of polyester film having a release face formed of a silicone-based release agent. Otherwise in the same manner as Production Example 1, was prepared a release-linered sealant sheet according to this Production Example.

Production Example 3

As the release liner placed on the photoirradiation side described later, was used a release liner R3 (available from NIPPA Corporation) having 0.5% light transmittance at 365 nm wavelength. Otherwise in the same manner as Production Example 1, was prepared a release-linered sealant sheet according to this Production Example.

For the release liner's light transmittance (365 nm wavelength), using a UV-vis spectrophotometer (UV-2550 available from Shimadzu Corporation), the release liner was subjected to spectroscopic analysis and the value at 365 nm wavelength was recorded as the transmittance of the release liner.

Experiment 1

Using a blacklight available from Toshiba Lighting & Technology Corporation, the release-linered sealant sheet prepared in Production Example 1 was subjected to photoirradiation at 2000 mJ/cm² through the release liner R1 (photoirradiation-side release liner). At one hour after the photoirradiation, the photoirradiation-side release liner was removed from the release-linered sealant sheet. The exposed sealant sheet surface was applied to a stainless-steel plate (SUS304BA plate). The other release liner was then removed from the sealant sheet and the resultant was stored in an environment at 25° C. for 14 days. By this, was formed a cured sealant that was free of surface tack and hard enough to not be left with marks when pressed with a thumb.

Experiment 2

Using a blacklight available from Toshiba Lighting & Technology Corporation, the release-linered sealant sheet prepared in Production Example 2 was subjected to photoirradiation at 2000 mJ/cm² through the release liner R2 (photoirradiation-side release liner). At one hour after the photoirradiation, the photoirradiation-side release liner was removed from the release-linered sealant sheet. The exposed sealant sheet surface was applied to a stainless-steel plate (SUS304BA plate). The other release liner was then removed from the sealant sheet and the resultant was stored in an environment at 25° C. for 14 days. By this, was formed a cured sealant that was free of surface tack and hard enough to not be left with marks when pressed with a thumb.

Experiment 3

Using a blacklight available from Toshiba Lighting & Technology Corporation, the release-linered sealant sheet prepared in Production Example 3 was subjected to photoirradiation at 2000 mJ/cm² through the photoirradiation-side release liner R3. At one hour after the photoirradiation, the exposed face of the sealant sheet was applied to a stainless-steel plate (SUS304BA plate). The other release liner was then removed from the sealant sheet and the resultant was stored in an environment at 25° C. for 14 days. By this, was formed a cured sealant that was free of surface tack and hard enough to not be left with marks when pressed with a thumb.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

10 target object
12, 14, 16 components
21 sealant sheet
21A first face
21B second face
31, 32 release liners
100, 200 release-linered sealant sheets

The invention claimed is:

1. A sealing method comprising the following steps in order:
    a step of obtaining a photo-curable sealant sheet,
    a step of subjecting the sealant sheet to photoirradiation, and
    a step of applying the sealant sheet to a target object, and
    wherein the sealant sheet comprises an epoxy group-containing polysulfide polymer (AB) having two or more epoxy groups per molecule, a thiol compound (C) having two or more thiol groups per molecule, and a photobase generator (D).

2. The method according to claim 1, wherein as the sealant sheet, a prolonged-curing photo-curable sealant sheet is used.

3. The method according to claim 1, wherein as the sealant sheet, an anionic photo-curable sealant sheet is used.

4. The method according to claim 1, wherein the application step is carried out before the sealant sheet has a 25° C. storage modulus above 0.7 MPa.

5. The method according to claim 1, that uses, as the sealant sheet, a photo-curable sealant sheet having a 25° C. storage modulus of 0.7 MPa or less at one hour after the sealant sheet's exposed face is subjected to photoirradiation at 2000 mJ/cm² using a blacklight.

6. The method according to claim 1, wherein as the sealant sheet, a photo-curable sealant sheet that forms a cured sealant having a tensile strength at break of 0.7 MPa or greater is used.

7. The method according to claim 1, that uses, as the sealant sheet, a photo-curable sealant sheet having a 25° C. storage modulus of 0.005 MPa or greater and 0.6 MPa or less before subjected to the photoirradiation.

8. The method according to claim 1, wherein as the sealant sheet, a photo-curable sealant sheet formed of a polysulfide-based sealant is used.

\* \* \* \* \*